United States Patent
Ando et al.

(10) Patent No.: US 8,346,010 B2
(45) Date of Patent: Jan. 1, 2013

(54) IMAGE PROCESSING DEVICE, IMAGING DEVICE, EVALUATION DEVICE, IMAGE PROCESSING METHOD, AND OPTICAL SYSTEM EVALUATION METHOD

(75) Inventors: Takamasa Ando, Osaka (JP);
Tsuguhiro Korenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 475 days.

(21) Appl. No.: 12/742,732

(22) PCT Filed: Sep. 11, 2009

(86) PCT No.: PCT/JP2009/004531
§ 371 (c)(1),
(2), (4) Date: May 13, 2010

(87) PCT Pub. No.: WO2010/032409
PCT Pub. Date: Mar. 25, 2010

(65) Prior Publication Data
US 2010/0246967 A1  Sep. 30, 2010

(30) Foreign Application Priority Data
Sep. 17, 2008  (JP) ................. 2008-238490

(51) Int. Cl.
*G06K 9/40* (2006.01)
*H04N 5/228* (2006.01)

(52) U.S. Cl. ............... 382/275; 382/274; 348/222.1

(58) Field of Classification Search .......... 382/274, 382/275; 348/222.1
See application file for complete search history.

(56) References Cited

U.S. PATENT DOCUMENTS
5,546,475 A * 8/1996 Bolle et al. ............. 382/190
(Continued)

FOREIGN PATENT DOCUMENTS
JP   4-127283   4/1992
(Continued)

OTHER PUBLICATIONS
"The Naturalness of Reproduced High Dynamic Range Images," Martin Cadik et al, Proceedings of the Ninth International Conference on Information Visualisation (IV'05), 2005, 6 pages.*
(Continued)

*Primary Examiner* — Wenpeng Chen
(74) *Attorney, Agent, or Firm* — Wenderoth, Lind & Ponack, LLP.

(57) ABSTRACT

An image processing device that can highly precisely correct an image with a degraded image quality due to the unnecessary diffracted light generated in the optical system including the diffractive optical element is provided. The image processing device includes an evaluation area setting unit (111) which detects a saturated pixel having a saturated luminance value, from among pixels included in the image and to set an area in the image including the detected saturated pixel as an evaluation area, a pixel count calculating unit (112) which calculates a pixel count for each of luminance values of pixels included in the set evaluation area, a first luminance value determining unit (113) which determines a first luminance value indicating a maximum luminance of an image of the unnecessary diffracted light, based on a transition of calculated pixel counts arranged in order of luminance value, a second luminance value determining unit (114) which determines a second luminance value which is a luminance value corresponding to a background of the image, and a correction unit (116) which corrects a luminance value of a pixel of luminance lower than luminance of the first luminance value and higher than luminance of the second luminance value from among the pixels included in the evaluation area so as to lower the luminance of the pixel.

20 Claims, 14 Drawing Sheets

U.S. PATENT DOCUMENTS

| | | | | |
|---|---|---|---|---|
| 5,756,981 | A * | 5/1998 | Roustaei et al. | 235/462.42 |
| 5,774,599 | A * | 6/1998 | Muka et al. | 382/254 |
| 5,872,870 | A * | 2/1999 | Michael | 382/291 |
| 5,949,905 | A * | 9/1999 | Nichani et al. | 382/173 |
| 6,088,059 | A * | 7/2000 | Mihara et al. | 348/335 |
| 6,266,439 | B1 * | 7/2001 | Pollard et al. | 382/164 |
| 6,373,993 | B1 * | 4/2002 | Nomura | 382/274 |
| 6,452,635 | B1 * | 9/2002 | Tanaka | 348/342 |
| 6,873,441 | B1 | 3/2005 | Kuwabara et al. | |
| 7,248,968 | B2 * | 7/2007 | Reid | 701/301 |
| 7,469,060 | B2 * | 12/2008 | Bazakos et al. | 382/173 |
| 7,489,345 | B2 | 2/2009 | Fukumoto | |
| 8,208,043 | B2 * | 6/2012 | Deng et al. | 348/241 |
| 2002/0037103 | A1 * | 3/2002 | Hong et al. | 382/173 |
| 2002/0196975 | A1 * | 12/2002 | Cahill | 382/171 |
| 2004/0151396 | A1 * | 8/2004 | Nomura et al. | 382/254 |
| 2005/0093992 | A1 * | 5/2005 | Fukumoto | 348/222.1 |
| 2005/0094896 | A1 * | 5/2005 | Masumura et al. | 382/276 |
| 2007/0035641 | A1 | 2/2007 | Yamada et al. | |
| 2007/0154109 | A1 * | 7/2007 | Ovsiannikov | 382/274 |
| 2008/0291505 | A1 * | 11/2008 | Shih et al. | 358/461 |
| 2009/0027521 | A1 | 1/2009 | Fukumoto | |
| 2009/0322901 | A1 * | 12/2009 | Subbotin et al. | 348/229.1 |

FOREIGN PATENT DOCUMENTS

| | | | |
|---|---|---|---|
| JP | 04127283 A * | 4/1992 | |
| JP | 7-274018 | 10/1995 | |
| JP | 11-122539 | 4/1999 | |
| JP | 2000-333076 | 11/2000 | |
| JP | 2001-077990 | 3/2001 | |
| JP | 2001-094804 | 4/2001 | |
| JP | 2004-120487 | 4/2004 | |
| JP | 2005-136852 | 5/2005 | |
| JP | 2005-136917 | 5/2005 | |
| JP | 2005-167485 | 6/2005 | |
| JP | 2006-014261 | 1/2006 | |
| JP | 2006-165937 | 6/2006 | |
| JP | 2008089335 A * | 4/2008 | |
| WO | WO 9415184 A1 * | 7/1994 | |
| WO | 2008/072709 | 6/2008 | |

OTHER PUBLICATIONS

International Search Report issued Nov. 17, 2009 in International (PCT) Application No. PCT/JP2009/004531.

* cited by examiner

FIG. 1
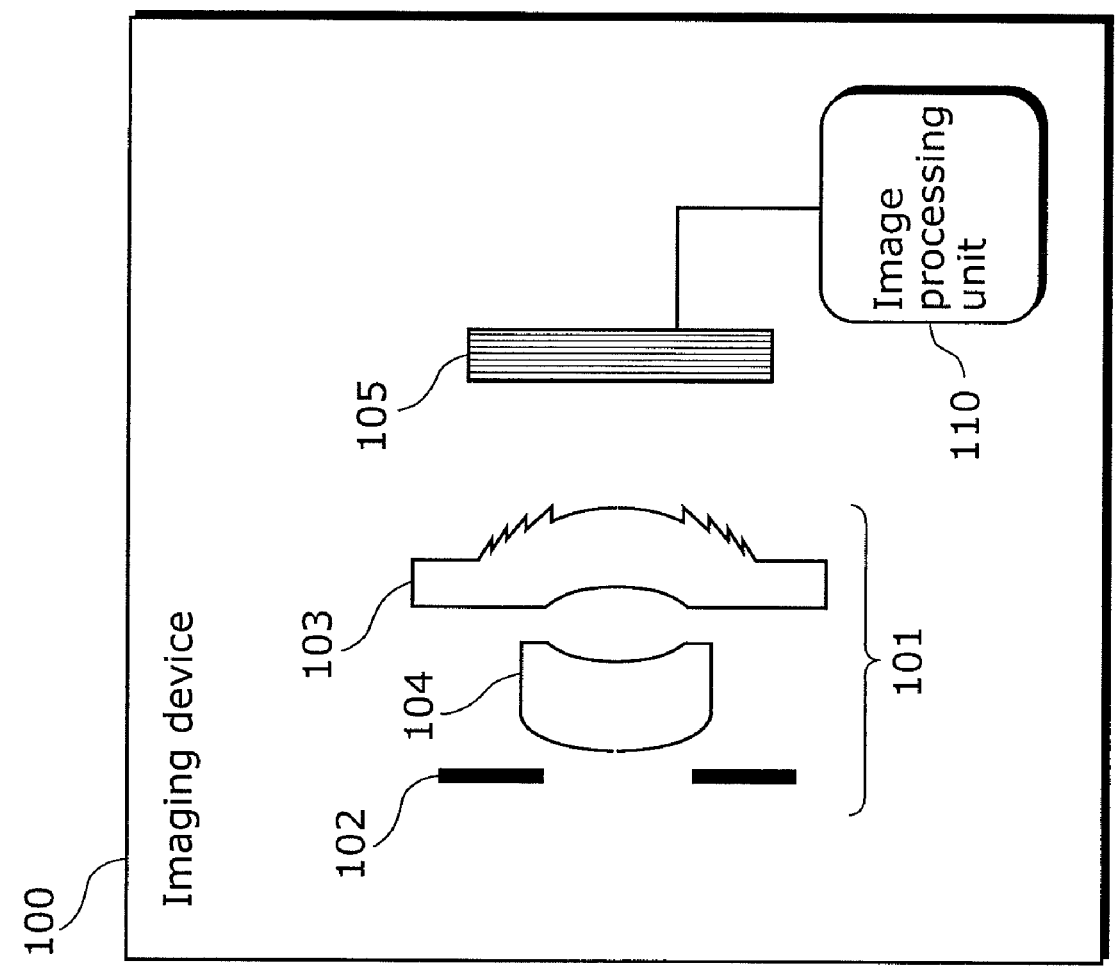
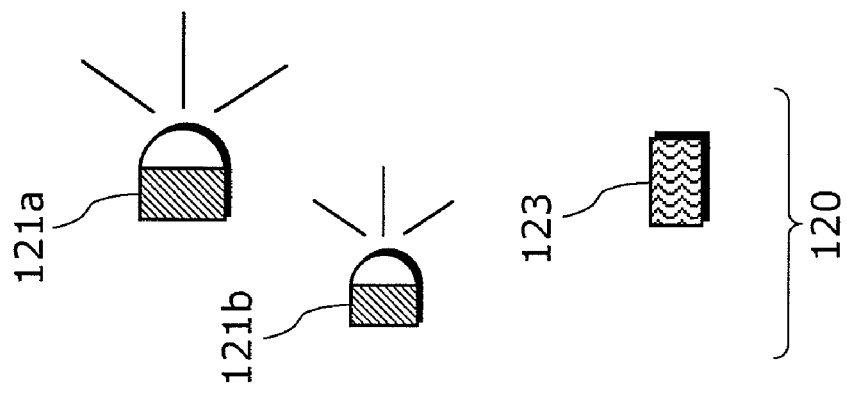

IMAGE PROCESSING DEVICE, IMAGING DEVICE, EVALUATION DEVICE, IMAGE PROCESSING METHOD, AND OPTICAL SYSTEM EVALUATION METHOD

TECHNICAL FIELD

The present invention relates to an image processing device which corrects images with degraded image quality due to unnecessary diffracted light generated in an optical system including a diffractive optical element. The present invention further relates to an evaluation device which evaluates capability regarding the unnecessary diffracted light in the optical system including the diffracted optical element and a method for evaluating the optical system.

BACKGROUND ART

It is widely known that a diffractive optical element having a surface with annular diffractive grating can reduce lens aberration such as field curvature and chromatic aberration (displacement on imaging points due to wavelength). This is because the diffractive grating formed on the diffractive optical element has peculiar properties such as inverse dispersion and anomalous dispersion, and has a high capability for correcting chromatic aberrations. The optical system including a diffractive optical element can reduce the number of optical elements (the number of lenses) by one or two, compared to an optical system of an equivalent capability which does not include a diffractive optical element (for example, an optical system composed only of aspheric lenses). Therefore, the optical system including the diffractive optical element is beneficial for reducing manufacturing cost. Furthermore, the optical system including the diffractive optical element can reduce an optical length. Thus, the optical system can reduce the height as well, which is advantageous for the system. Furthermore, when the optical system includes a diffractive optical element having a blazed diffraction grating or a diffraction grating having a cross-section with small steps internally contacting the blaze, the optical system can make the diffraction efficiency for a single wavelength almost 100%.

More specifically, for example, the depth of diffraction grating with 100% diffraction efficiency of first order diffracted light (thickness of blaze) is theoretically calculated by the following equation (1). Here, λ denotes the wavelength. Furthermore, d denotes the depth of diffraction grating. In addition, n (λ) denotes a refractive index, and is a function of the wavelength λ.

[Math. 1]

$$d = \frac{\lambda}{n(\lambda) - 1} \quad (1)$$

As clearly shown in the equation (1), the value of depth d of the diffraction grating with 100% diffraction efficiency changes along with the change in the wavelength λ. More specifically, the diffraction efficiency is not 100% in the wavelength λ different from the specific wavelength (designed wavelength) λ when the value of diffraction grating depth d is fixed. As a result, when a lens used for imaging wide wavelength band (for example, visible light with wavelength approximately from 400 nm to 700 nm) includes a diffractive optical element, unnecessary diffracted light is generated. Subsequently, the generated unnecessary diffracted light appears as flair or a ghost and degrades an image, or reduces the modulation transfer function (MTF) characteristics. More specifically, when the diffraction grating is formed on both surfaces of a single lens or multiple surfaces of the optical system, the unnecessary diffracted light is generated more prominently.

In response to this problem, a diffractive optical element that can reduce the wavelength dependency of the diffraction efficiency has been proposed. FIG. 16 is a diagram illustrating an example of the diffractive optical element 1000 including a protective film 1003 for reducing wavelength dependency of the diffraction efficiency. As shown in FIG. 16, in the diffractive optical element 1000, on the surface where the diffraction grating 1002 is formed, optical material having refractive index and refractive index dispersion different from the base material 1001 is painted or connected as the protective film 1003. The protective film 1003 prevents unnecessary diffracted light from being generated in the diffractive optical element 1000. Furthermore, in such a diffractive optical element 1000, setting, at a predetermined condition, the refractive index of the base material 1001 in which the diffraction grating is formed and the refractive index of the protective film 1003 formed to cover the diffraction grating can further reduce the wavelength dependency of the diffraction efficiency. As described above, the diffractive optical element 1000 including the protective film 1003 indicates, theoretically, high diffraction efficiency in a broad wavelength.

However, even the diffractive optical element with the protective film generates the unnecessary diffracted light because of insufficiently transcribed diffraction grating at the time of forming, or displaced refractive index adjustment of the base material and the protective film material.

Furthermore, even if the diffraction efficiency is high, an absolute luminance value of the unnecessary diffracted light is large when capturing a very brightly shining light source as the object. Thus, an image is formed around the image of object with a saturated luminance value, corresponding to a position where the object is not supposed to exist. In other words, the degraded image quality due to the unnecessary diffracted light becomes a problem particularly when there is a large contrast between the object and the area around the object when a bright object such as a light is captured in a dark background such as nighttime scenery.

In response to this problem, a technique has been proposed for removing an image of unnecessary diffracted light (hereinafter simply referred to as an unnecessary diffracted light image) by calculating the luminance value of the unnecessary diffracted light image, by using least square from a two-dimensional point spread of the unnecessary diffracted light image (for example, see Patent Literature 1).

Furthermore, another technique has been also proposed for removing the unnecessary diffracted light image using two images capturing the same object (for example, see Patent Literature 2). According to the technique disclosed in Patent Literature 2, when there is a pixel with saturated luminance value in the captured image (first frame), the object same as the first frame is captured such that the luminance value of the pixel is not saturated (second frame). Then, the unnecessary diffracted light image included in the image captured in the first frame is removed by calculating the luminance value of the unnecessary diffracted light image using the adjusted value of the exposure time when the second frame is captured.

Furthermore, another technique has been proposed for removing a base color or an offset by detecting a threshold using a histogram indicating frequency distribution of the luminance value (for example, see Patent Literature 3).

[Citation List]

[Patent Literature]

[Patent Literature 1] Japanese Unexamined Patent Application Publication No. 2005-167485

[Patent Literature 2] Japanese Unexamined Patent Application Publication No. 2000-333076

[Patent Literature 3] Japanese Unexamined Patent Application Publication No. 2001-94804

SUMMARY OF INVENTION

[Technical Problem]

However, with the technique in Patent Literature 1, the luminance value of the unnecessary diffracted light image is calculated using the least square. Thus, there is a case where the calculated luminance value of the unnecessary diffracted light image is different from the actual luminance value of unnecessary diffracted light image. For example, when there is a large aberration of lens, the unnecessary diffracted light image may have unevenness in its distribution or spreads to have a star shape. Additionally, the unevenness in the distribution of the unnecessary diffracted light image emerges when the complex shaped object is captured or when an image with a large noise is captured. As such, when there is unevenness in the distribution of the unnecessary diffracted light image, it is difficult to accurately estimate the luminance value of the unnecessary diffracted light image with the technique disclosed in Patent Literature 1 using the least square. As a result, the unnecessary diffracted image is not fully removed.

Furthermore, with the technique disclosed in Patent Literature 2, the same object has to be captured twice, which result in a long processing time. Furthermore, the luminance value of the unnecessary diffracted light image calculated with the technique disclosed in Patent Literature 2 is different from the luminance value of the actual unnecessary diffracted light image, since the distribution of the unnecessary diffracted light image is an estimate. Furthermore, the technique in Patent Literature 2 cannot be used when capturing an object with motion, since it is difficult to capture the same object twice in a substantially identical condition. In other words, the technique disclosed in Patent Literature 2 cannot be used for an object with motion.

Furthermore, the technique disclosed in Patent Literature 3 does not aim to remove an image of a relatively high luminance but to remove an image of a relatively low luminance such as the base color or an accidentally printed portion in the back by a copier. Furthermore, there is a possibility that the low luminance object image is inadvertently removed, since the entire image is to be evaluated.

The present invention has been conceived in view of the problem, and it is an object of the present invention to provide an image processing device that can highly precisely correct an image with a degraded image quality due to the unnecessary diffracted light generated in the optical system including the diffractive optical element regardless of the shape of the unnecessary diffracted light image, an imaging device and others.

Solution to Problem

In order to achieve the object, the image processing device according to an aspect of the present invention is an image processing device which corrects an image with a degraded image quality due to unnecessary diffracted light generated in an optical system including a diffractive optical element, the image processing device including: an evaluation area setting unit which detects a saturated pixel having a saturated luminance value, from among pixels included in the image and to set an area in the image including the detected saturated pixel as an evaluation area; a pixel count calculating unit which calculates a pixel count for each of luminance values of pixels included in the set evaluation area; a first luminance value determining unit which determines a first luminance value indicating a maximum luminance of an image of the unnecessary diffracted light, based on a transition of calculated pixel counts arranged in order of luminance value; a second luminance value determining unit which determines a second luminance value which is a luminance value corresponding to a background of the image; and a correction unit which corrects a luminance value of a pixel of luminance lower than luminance of the first luminance value and higher than luminance of the second luminance value from among the pixels included in the evaluation area so as to lower the luminance of the pixel.

This allows correction on the area of the image including the saturated pixels that the unnecessary diffracted light image is highly likely present on the periphery, and thereby reducing the number of inadvertent correction on the object image that does not need the correction.

In addition, the luminance value of the pixel that needs correction is determined based on the transition of the pixel counts for each luminance value in the evaluation area. Thus, it is possible to correct the image at high precision regardless of the shape of the unnecessary diffracted light image.

Furthermore, the correction can be performed using only one image. Thus, it is possible to perform the correction even when the object is with motion.

Furthermore, it is preferable that, when the image includes a plurality of saturated pixels having the saturated pixel, the evaluation area setting unit sets a saturated pixel group by grouping neighboring saturated pixels and to set the evaluation area for the set saturated pixel group.

This enables setting the evaluation area for the groups of saturated pixels each of which corresponds to a corresponding one of the objects, even when multiple objects are captured. Thus, it is possible to further reduce the number of inadvertent correction on the object image that does not need the correction.

Furthermore, it is preferable that the evaluation area setting unit sets the evaluation area that becomes larger as the saturated pixel group becomes larger.

This enables setting the evaluation area according to the size of the saturated pixel group. Thus, it is possible to set an evaluation area with a size matching the unnecessary diffracted light image which tends to expand according to the size of the saturated pixel group. As a result, it is possible to reduce the number of inadvertent correction even more precisely on the object image that does not need correction.

In addition, it is preferable that the evaluation area setting unit sets an imaging range of diffracted light of a predetermined diffraction order as the evaluation area, the diffracted light corresponding to the saturated pixel group and being included in the unnecessary diffracted light.

This allows setting the evaluation area according to the characteristics of the optical system. Thus, it is possible to set the evaluation area to include all of the areas where the unnecessary diffracted light image exists and not to include the areas where the unnecessary diffracted light image does not exist. As a result, it is possible to reduce the number of inadvertent correction even more precisely on the object image that does not need correction. Furthermore, it reduces the processing amount on the area where the unnecessary diffracted light image does not exist. Thus, it is possible to reduce the processing load.

In addition, the first luminance value determining unit may determine, as the first luminance value, a luminance value exceeding a predetermined pixel count for the first time while tracing a transition of the pixel counts from high luminance to low luminance.

This allows determining the first luminance value indicating the maximum luminance of the unnecessary diffracted light image according to the characteristics of the luminance value of pixels in the evaluation area. Thus, it is possible to correct the image at high precision regardless of the shape of the unnecessary diffracted light image.

In addition, the first luminance value determining unit may calculate a luminance value of highest luminance among luminance values each of which is in a highest point of an upper convex formed by a transition of the pixel counts except a luminance value of the saturated pixel, in a case where a horizontal axis represents the luminance values and a vertical axis represents the pixel counts, and determine, as the first luminance value, a luminance value of luminance higher than the calculated luminance value and lower than luminance value of the saturated pixel.

This allows determining the first luminance value indicating the maximum luminance of the unnecessary diffracted light image, according to the distribution characteristics of the luminance value of pixels in the evaluation area. Thus, it is possible to correct the image at high precision, regardless of the shape of the unnecessary diffracted light image.

In addition, the second luminance value determining unit may determine the second luminance value based on a luminance value of a pixel at an edge of the evaluation area.

This allows determining the second luminance value using the luminance value of the pixels in the evaluation area which are assumed to be least affected by the unnecessary diffracted light. Thus, it is possible to determine the luminance value corresponding to the background at high precision.

In addition, the second luminance value determining unit may determine, as the second luminance value, a luminance value of lowest luminance among luminance values each of which is in a highest point of an upper convex formed by a transition of the pixel counts, in a case where a horizontal axis represents the luminance values and a vertical axis represents the pixel counts.

This allows determining the second luminance value according to the distribution characteristics of the luminance value of pixels in the evaluation area. Thus, it is possible to determine the luminance value corresponding to the background at high precision, without affected by the shape of unnecessary diffracted light image.

In addition, each of the pixels included in the image may ha luminance values each of which corresponds to a corresponding one of wavelength bands, the evaluation area setting unit may set the evaluation area for each of the wavelength bands, the pixel count calculating unit may calculate the pixel count for each of the wavelength bands, the first luminance value determining unit may determine the first luminance value for each of the wavelength bands, the second luminance value determining unit may determine the second luminance value for each of the wavelength bands, and the correction unit may correct the luminance value for each of the wavelength bands.

This allows the highly precise correction on the image even if the image is captured by the optical system including a diffractive optical element having characteristics that differ according to the wavelength.

In addition, the luminance value may correspond to a specific wavelength band only.

This allows processing a specific wavelength band when it is clear in advance that the light in specific wavelength band is largely affected by the unnecessary diffracted light.

Furthermore, a determining unit determines whether or not the second luminance value is smaller than a predetermined threshold, in which the correction unit corrects the luminance value only when the determining unit determines that the second luminance value is smaller than the predetermined threshold may be included.

This avoids the correction on the evaluation area when the object image different from the object image corresponding to the saturated pixel group overlaps the evaluation area. Thus, it is possible to further reduce the number of inadvertent correction on the object image that does not need the correction. This also makes the correction on the evaluation area where the unnecessary diffracted light image is not detected due to high luminance in the background. Thus, it is possible to reduce the processing load.

In addition, the imagine device according to an aspect of the present invention is an imaging device which corrects an image with a degraded image quality due to unnecessary diffracted light, the imaging device including: an optical system including a diffractive optical element; an imaging system which captures light that is transmitted the optical system; and the image processing device.

This allows implementation as an imaging device including the image processing device.

In addition, the evaluation apparatus is an evaluation apparatus which evaluates capability, regarding unnecessary diffracted light, of an optical system including a diffractive optical element, the evaluation apparatus including: a light source arranged at a predetermined distance from the optical system; an imaging system which captures light which is from the light source and is transmitted the optical system; an evaluation area determining unit which detects a saturated pixel having a saturated luminance value, from among pixels included in the image and to set an area in the image including the detected saturated pixel as an evaluation area; a pixel count calculating unit which calculates a pixel count for each of luminance values of pixels included in the set evaluation area; a first luminance value determining unit which determines a first luminance value indicating a maximum luminance of an image of the unnecessary diffracted light, based on a transition of calculated pixel counts arranged in order of luminance value; a second luminance value determining unit which determines a second luminance value which is a luminance value corresponding to a background of the image; and an evaluation unit which evaluates the capability of the optical system regarding the unnecessary diffracted light, using a luminance value of a pixel of luminance lower than luminance of the first luminance value and higher than luminance of the second luminance value from among the pixels included in the evaluation area.

This allows the evaluation regarding the unnecessary diffracted light image on the area including the saturated pixels that the unnecessary diffracted light image is highly likely present on the periphery, and thereby reducing the number of cases where the object image that is not supposed to be evaluated is determined as the image to be evaluated.

Furthermore, the luminance values of the pixels that need to be evaluated are determined based on the transition of the pixel counts for each luminance value in the evaluation area. This enables a highly precise evaluation of the unnecessary diffracted light regardless of the shape of the unnecessary diffracted light.

Furthermore, the evaluation can be performed using only one image. Thus, it is possible to perform the evaluation regarding the unnecessary diffracted light even when the object is with motion.

In addition, it is preferable that the light source is point source of light.

This reduces the overlapped part of the object image and the unnecessary diffracted light image. Thus, it is possible to evaluate the capability of the optical system regarding the unnecessary diffracted light at high precision.

Furthermore, it is preferable to include an object lens which is arranged between the optical system and the imaging system and magnifies an image formed by the optical system.

This allows magnifying the image obtained by the optical system. Thus, it is possible to evaluate the capability of the optical system regarding the unnecessary diffracted light at higher precision.

Advantageous Effects of Invention

According to the present invention, it is possible to correct the image with degraded image quality due to the unnecessary diffracted light generated in the optical system including the diffractive optical element, and to correct the image at high precision regardless of the shape of the unnecessary diffracted light image.

BRIEF DESCRIPTION OF DRAWINGS

FIG. 1 illustrates a structure of an imaging device according to Embodiment 1 of the present invention.

DESCRIPTION OF EMBODIMENTS (Embodiment 1)

Figure 2:
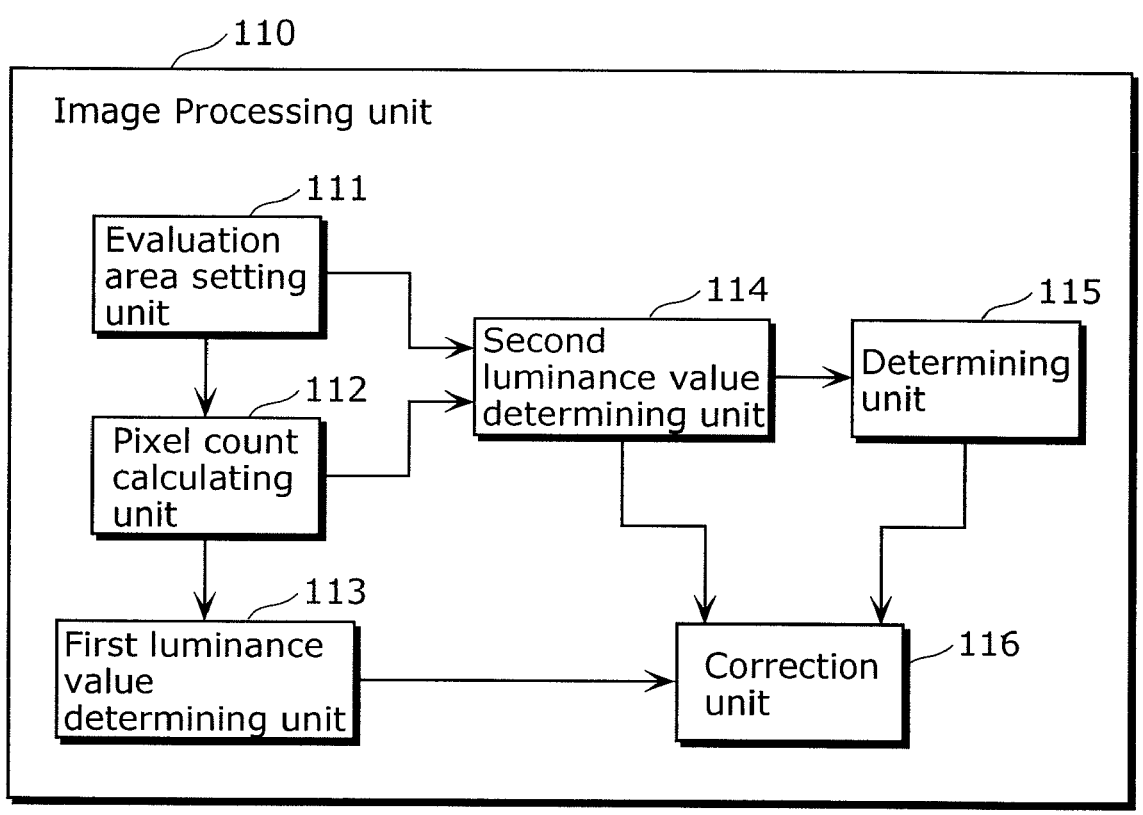
FIG. 2 is a block diagram illustrating a characteristic functional structure of an image processing unit which corrects an image degraded due to an unnecessary diffracted light.

An imaging device according to Embodiment 1 of the present invention shall be described hereafter with reference to the drawings.

FIG. 1 is a diagram illustrating a structure of an imaging device 100 according to Embodiment 1 of the present invention. As shown in FIG. 1, the imaging device 100 includes an optical system 101, an imaging element 105 and an image processing unit 110.

The optical system 101 includes a stop 102, a diffractive optical element 103, and a refractive optical element 104. The number of diffractive optical element 103 and refractive optical element 104 included in the optical system 101 is determined according to the design purpose of the optical system. Note that, the optical system 101 in Embodiment 1 includes one diffractive optical element 103 and one refractive optical element 104. However, the optical system according to the present invention is not limited to this number. For example, the optical system 101 may include multiple diffractive optical elements 103 and multiple refractive optical elements 104.

The stop 102 adjusts the amount of light that enters the imaging element 105. Note that the position of the stop 102 is determined according to the design purpose of the optical system 101. In other words, it is not necessary for the stop 102 to be positioned on the side of object as illustrated in FIG. 1. The stop 102 may be provided on the side of the imaging element 105, or may be provided between the diffractive optical element 103 and the refractive optical element 104.

Figure 16:
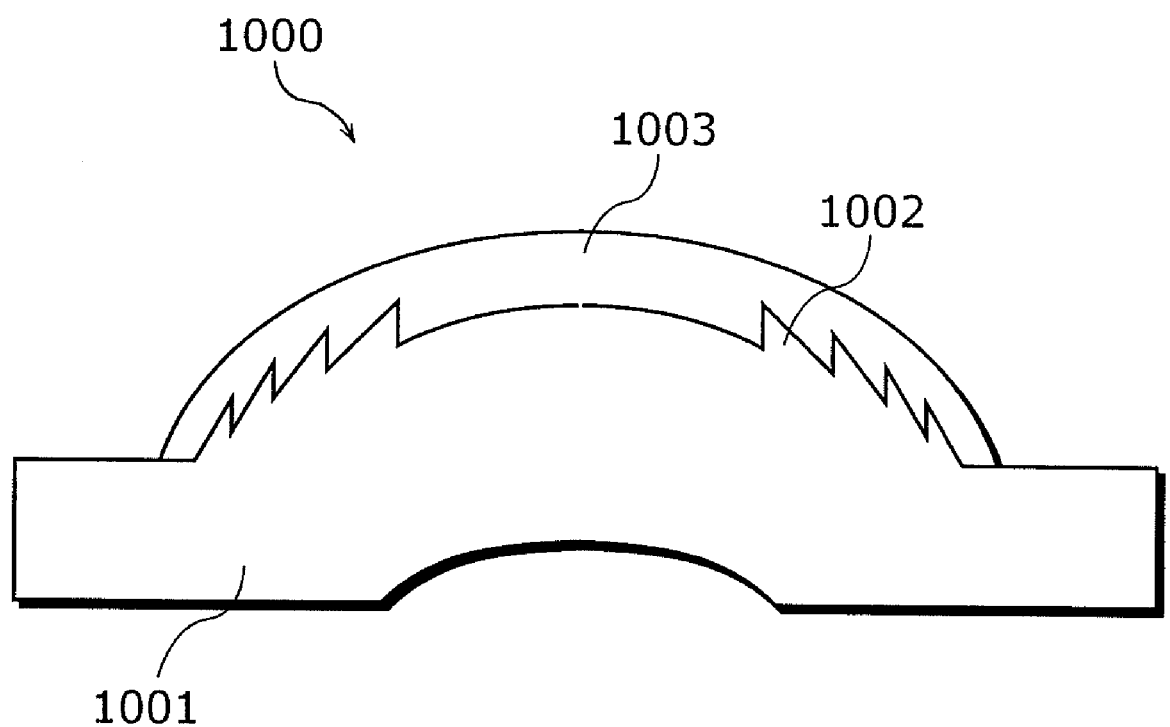
FIG. 16 illustrates an example of conventional diffractive optical element.

The diffractive optical element 103 is an optical element using the diffraction phenomenon of light. More specifically, on the diffractive optical element 103, concentric circular diffraction grating is formed on the convex face on the side of the imaging element 105. Note that, the diffractive optical element 103 may be a flat plate. In addition, the diffraction grating may be formed on a flat plate or on a concave face. In addition, the diffraction grating may be formed only on one side of the diffractive optical element, or may be formed on both sides. Furthermore, the diffractive optical element 103 may be, as shown in FIG. 16, a diffractive optical element in which optical material having a refractive index or refractive index dispersion different from the base material is painted or connected on a surface where the diffraction grating is formed.

The refractive optical element 104 is a convex lens or a concave lens, for example, and is provided in front of or behind the diffractive optical element 103, according to the design purpose of the optical system.

The imaging element 105 is an example of an imaging system, and includes of a solid-state imaging device such as the charge coupled device (CCD) or the complementary metal oxide semiconductor (CMOS), for example. The imaging element 105 converts the light from the object which transmitted the optical system 101 into electric signals.

The image processing unit 110 is composed of, for example, a central processing unit (CPU), a memory, a system LSI, and others. The image processing unit 110 corrects image quality degraded by the unnecessary diffracted light in the image obtained based on the electric signals from the imaging element 105. Note that, the unnecessary diffracted light is a part of the diffracted light generated in the diffractive optical element and indicates the diffracted light in a different order than the diffraction order determined by design in advance (designed diffraction order).

The objects 120 illustrated in FIG. 1 are an example of the object captured by the imaging device 100. The objects 120 include brightly shining light sources 121a and 121b, and an object 123.

FIG. 2 is a block diagram illustrating characteristic functional structure of the image processing unit 110 which corrects an image degraded due to the unnecessary diffracted light.

As illustrated in FIG. 2, the image processing unit 110 in the imaging device 100 includes an evaluation area setting unit 111, a pixel count calculating unit 112, a first luminance value determining unit 113, a second luminance value determining unit 114, a determining unit 115, and a correction unit 116.

The evaluation area setting unit 111 detects saturated pixels, the luminance value of each of which is saturated, among the pixels composing the image. Here, the luminance value denotes luminance which indicates the intensity of light converted into numbers. In addition, the luminance value denotes luminance which indicates the numerically-converted intensity of light for each wavelength band. Note that, Embodiment 1 describes a case where the luminance value increases as the luminance intensifies. The saturated pixel denotes a pixel with a luminance value "255", when the luminance values of an image are represented in 256 tones (0 to 255). Furthermore, the saturated pixel may be, for example, pixels with luminance values equal to or higher than a predetermined threshold (for example, "250", "240", and others).

Furthermore, the evaluation area setting unit 111 sets an area of the image including the detected saturated pixels as an evaluation area. The evaluation area setting unit 111 sets, when multiple saturated pixels are included in the image, a saturated pixel group which is a group of neighboring saturated pixels, and sets an evaluation area for each of the determined groups of saturated pixels.

In addition, the evaluation area setting unit 111 sets an evaluation area that becomes larger as the saturated pixel group becomes larger. This is because, the size of the unnecessary diffracted light image that appears around the saturated pixel group increases as the size of the group of saturated pixels increases.

More specifically, the evaluation area setting unit 111 sets an imaging range of diffracted light of a predetermined diffraction order as the evaluation area. The diffracted light corresponds to the saturated pixel group and is included in the unnecessary diffracted light. The details shall be described later. Note that, the evaluation area setting unit 111 may simply set an area with a size calculated by multiplying the size of the saturated pixel group by a predetermined proportionality factor as the evaluation area.

The pixel count calculating unit 112 calculates a pixel count for each of the luminance values of the pixels included in the evaluation area.

The first luminance value determining unit 113 determines a first luminance value indicating a maximum luminance of the unnecessary diffracted light image based on a transition of the pixel counts calculated by the pixel count calculating unit 112 arranged in order of luminance value.

More specifically, the first luminance value determining unit 113 determines, as the first luminance value, the luminance value exceeding a predetermined pixel count for the first time when tracing the transition of the pixel counts from high luminance to low luminance. Here, the luminance value when exceeding the predetermined pixel counts is a luminance value when a pixel count smaller than the predetermined pixel count changes to a pixel count greater than the predetermined pixel count.

The second luminance value determining unit 114 determines a second luminance value which is a luminance value corresponding to a background of the image. More specifically, the second luminance value determining unit 114 determines the second luminance value based on the luminance value of the pixel at the edge of the evaluation area.

The determining unit 115 determines whether or not the second luminance value is smaller than the predetermined threshold.

The correction unit 116 corrects, from among the pixels included in the evaluation area, the luminance value of a pixel having luminance lower than the luminance of the first luminance value and higher than the luminance of the second luminance value so as to lower the luminance of the pixel, only when is the determining unit 115 determines that the second luminance value is smaller than the predetermined threshold.

Figure 3:
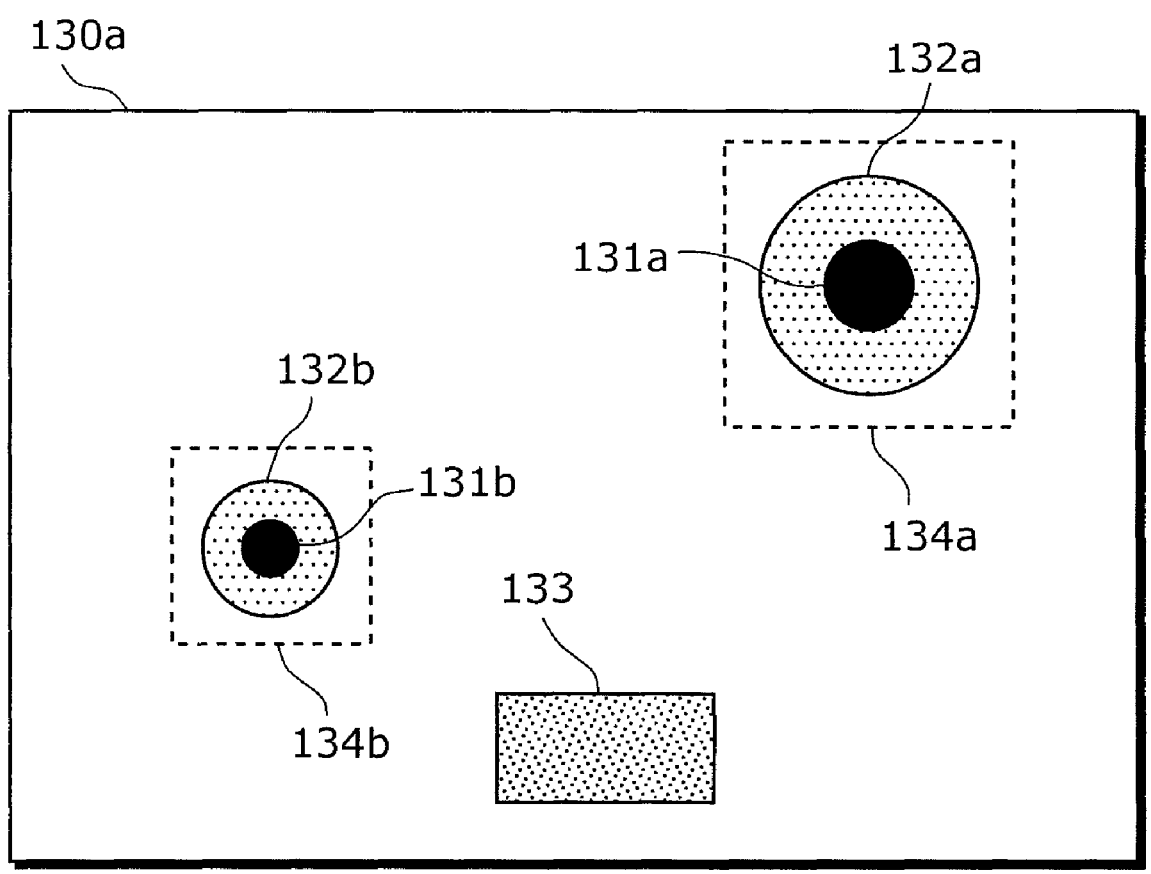
FIG. 3 is a diagram for illustrating an evaluation area determined by an evaluation area setting unit.

FIG. 3 illustrates an evaluation area set by the evaluation area setting unit 111. Note that the image 130a in FIG. 3 is illustrated to represent the maximum luminance in black and the minimum luminance in white.

The image 130a illustrated in FIG. 3 is an example of an image when capturing the brightly shining light sources 121a and 121b and the object 123 in the dark using an optical system including the diffractive optical element. Since the light sources 121a and 121b are brightly shining, the luminance values of the corresponding object images 131a and 131b, respectively, are saturated. Additionally, unnecessary diffracted light images 132a and 132b exist around the object images 131a and 131b, respectively. The unnecessary diffracted light images 132a and 132b are detected around an object image with a saturated luminance value; when capturing an object with high luminance such as a brightly shining light source or when imaging with a long exposure time or high gain.

On the other hand, the unnecessary diffracted light image is not detected around the object image 133 which is an image corresponding to the object 123 with low luminance. This is because, the larger the luminance value of the object image, the larger the luminance value of the unnecessary diffracted light image becomes. In other words, the unnecessary diffracted light image corresponding to the object image with a small luminance value is not detected due to its very small luminance value.

In the image 130a, the evaluation area setting unit 111 sets the evaluation areas 134a and 134b for the object images 131a and 131b which are groups of pixels with saturated luminance values (saturated pixels), respectively. As illustrated in FIG. 3, the evaluation area setting unit 111 sets the evaluation areas 134a and 134b to include the unnecessary diffracted light images 132a and 132b, respectively. Note that, the details of the setting method shall be described later.

Next, the operations of the image processing unit 110 in the imagine device 100 composed as above shall be described.

Figure 4:
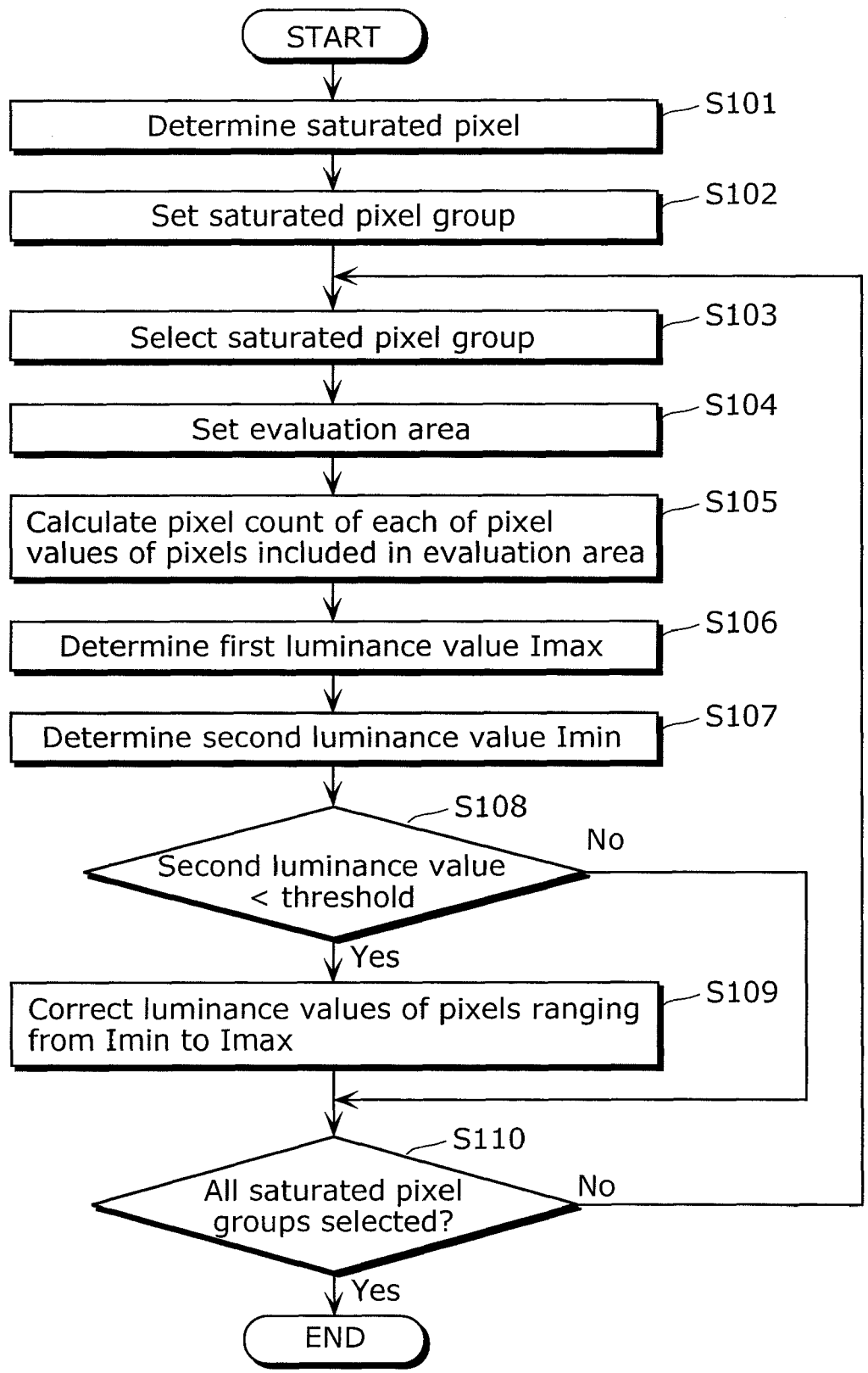
FIG. 4 is a flowchart illustrating a process flow by the image processing unit.

FIG. 4 is a flowchart illustrating the process flow by the image processing unit 110.

First, the evaluation area setting unit 111 detects saturated pixels that are pixels with saturated luminance values, from among the pixels composing the image (step S101).

Next, the evaluation area setting unit 111 sets a saturated pixel group obtained by grouping the neighboring saturated pixels, from among the detected saturated pixels (step S102). Note that, the term "neighboring" refers to a state where the pixels are present within a distance defined by a predetermined pixel count (for example, one pixel, four pixels, eight pixels, and so on). Accordingly, when the predetermined pixel count is one pixel and in the case where a pixel adjacent to the saturated pixel is a saturated pixel, the evaluation area setting unit 111 groups the saturated pixels into the same saturated pixel group.

More specifically, the evaluation area setting unit 111 detects respective pixels composing the object images 131a and 131b illustrated in FIG. 3 as saturated pixels. The evaluation area setting unit 111 further sets the object image 131a that is adjacent saturated pixels as the first saturated pixel group. Similarly, the evaluation area setting unit 111 sets the object image 131b as the second saturated pixel group.

Next, the evaluation area setting unit 111 selects one of the saturated pixel groups that has been set (step S103). More specifically, the first saturated pixel group is selected, for example.

Next, the evaluation area setting unit 111 sets the evaluation area according to the size of the selected saturated pixel group (step S104). More specifically, the evaluation area setting unit 111 sets the evaluation area that becomes larger as the saturated pixel group becomes larger. The following illustrates a specific example of the process in step S104 with reference to the image 130a illustrated in FIG. 3.

The evaluation area setting unit 111 calculates a size of the object image 131a using the area of the object image 131a, when the first saturated pixel group (the object image 131a) is selected in step S103. For example, assuming that the object image 131a has a round shape, the evaluation area setting unit 111 calculates the diameter of the circle corresponding to the area of the object image 131a as the size of the object image 131a. Subsequently, the evaluation area setting unit 111 sets the imaging range of the light of a predetermined diffraction order included in the unnecessary diffracted light as the evaluation area 134a, using the size of the calculated object image 131a. Here, the evaluation area setting unit 111 sets the evaluation area 134a such that the center of the evaluation area 134a corresponds to the center of the object image 131a. Details for the imaging range of the light at the predetermined diffraction order included in the unnecessary diffracted light shall be described later.

Note that, when the second saturated pixel group (the object image 131b) is selected in step S103, the evaluation area setting unit 111 sets the evaluation area 134b around the object image 131b, in the same manner as the description above.

As such, the evaluation area setting unit 111 sets the evaluation areas 134a and 134b not to include the object image 133 but to include the unnecessary diffracted light image 132a and 132b.

The description returns to the flowchart in FIG. 4.

Next, the pixel count calculating unit 112 calculates the pixel count of each of the pixels included in the evaluation area that has been set (step S105).

Next, the first luminance value determining unit 113 determines the first luminance value Imax which is the maximum value of the luminance value of the unnecessary diffracted light, based on the transition of the pixel counts arranged in order of luminance value (step S106).

The processes in step S105 and step S106 are specifically described as follows with reference to FIG. 5.

Figure 5:
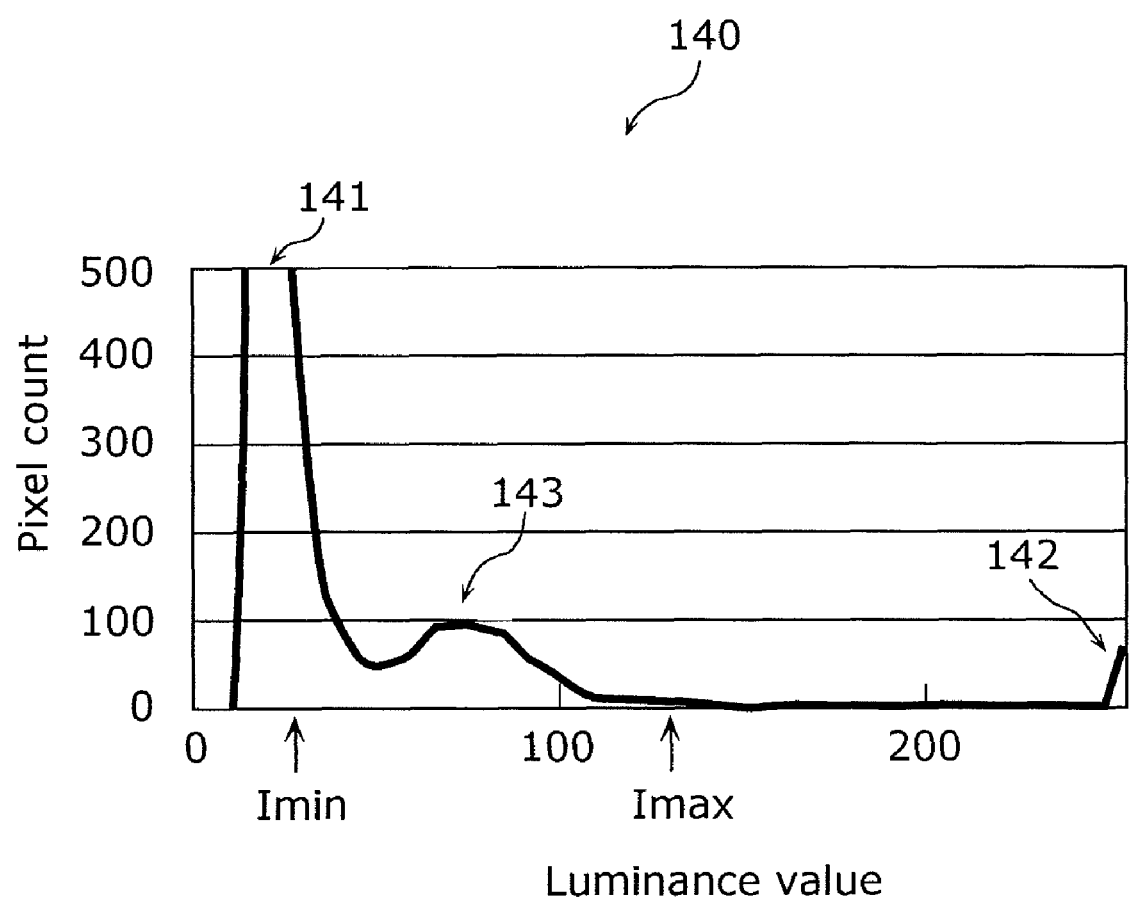
FIG. 5 illustrates an example of histogram of a luminance value in the evaluation area.

FIG. 5 illustrates an example of histogram of luminance values in the evaluation area.

The pixel count calculating unit 112 calculates the pixel count of each luminance value of the pixels included in the evaluation area 134a illustrated in FIG. 3 when the first saturated pixel group is selected in step S103. Subsequently, the pixel count calculating unit 112 generates a histogram 140 of the luminance value illustrated in FIG. 5, for example. Here, the histogram of the luminance value is a chart with the luminance value as the horizontal axis and the pixel count as the vertical axis. Thus, the histogram 140 indicates a transition of the pixel counts arranged in order of luminance value.

Subsequently, the first luminance value determining unit 113 determines, as the first luminance value Imax, the luminance value when the pixel count exceeds the predetermined pixel count "10" for the first time while tracing the transition of the pixel count illustrated in the histogram 140 from larger luminance values (right side) to smaller luminance values (left side). As illustrated in FIG. 5, the first luminance value Imax determined as described above corresponds to the maximum luminance value of the unnecessary diffracted light image 132a. Here, the predetermined pixel count may not be necessarily 10. When the histogram 140 contains a lot of noise, there is a possibility that the maximum luminance value of the unnecessary diffracted light image 132a is falsely detected at a higher value. A value on a larger side may be selected as the predetermined pixel count in order to prevent this problem. The noise in the histogram 140 is likely to be generated when the luminance in the image within the evaluation area is uneven, or when an object with a complex shape or luminance is captured. The amount of noise can be detected as a radio-frequency wave through Fourier transforming the histogram 140. Thus, it is possible to determine whether the amount is large or small, and to determine the predetermined pixel count accordingly. Furthermore, if the value set as the predetermined pixel count is too large, the maximum luminance value of the unnecessary diffracted light image 132a becomes too small. As a result, the unnecessary diffracted light image 132a is not sufficiently removed. For this reason, careful setting is required. In consideration of these points, the predetermined pixel count may be determined, for example, as half or one tenth of the pixel count of the peak 143 corresponding to the unnecessary diffracted light image 132a.

The following describes the reason why the first luminance value Imax determined as above corresponds to the maximum luminance value of the unnecessary diffracted light image 132a.

In general, the image with image quality adversely affected by the unnecessary diffracted light is an image capturing a very bright object in the complete darkness. This is because, the contrast ratio between the unnecessary diffracted light image and the background increases and the unnecessary diffracted light image visually stands out, even if the luminance value of the unnecessary diffracted light image is small and the background is large. In the case of the image capturing the very bright object in the complete darkness, three peaks of the pixel counts are usually detected, that is, the peak 142 corresponding to the object image 131a with saturated luminance values, the peak 143 corresponding to the unnecessary diffracted light image 132a, and the peak 141 corresponding to the background, as illustrated in FIG. 5. In addition, the pixel counts at the luminance values between the luminance value of the peak 142 corresponding to the object image 131a and the luminance value of the peak 143 corresponding to the unnecessary diffracted light image 132a are usually in the proximity of 0. Therefore, when the transition of the pixel count is traced from high luminance to low luminance, the luminance value at the time of exceeding the predetermined pixel count can be detected as the first luminance value Imax that is the maximum luminance value of the unnecessary diffracted light image 132a.

Note that, when there is large noise in the histogram, it is preferable for the first luminance value determining unit 113 to determine the first luminance value Imax after averaging the transition of the pixel count, such as the moving average.

The description returns to the flowchart in FIG. 4.

Next, the second luminance value determining unit 114 calculates the luminance value of the background of the evaluation area using the luminance values of the pixels at the edge of the evaluation area. Subsequently, the second luminance value determining unit 114 determines the calculated luminance value as the second luminance value Imin (step S107). More specifically, regarding the luminance value of the background of the evaluation area, the second luminance value determining unit 114 determines the average value of the luminance values of the pixels corresponding to the four vertices in the rectangle evaluation area as the second luminance value Imin.

Next, the determining unit 115 determines whether or not the determined second luminance value Imin is smaller than the predetermined threshold value (step S108).

Here, when the second luminance value Imin is smaller than the predetermined threshold (Yes in step S108), the correction unit 116 corrects the luminance values of the pixels of luminance smaller than the first luminance value Imax and larger than the second luminance value Imin, from among the pixels included in the evaluation area (step S109). In other words, the correction unit 116 processes pixels with luminance values smaller than the first luminance value Imax and larger than the second luminance value Imin as the pixels constituting the unnecessary diffracted light image, and corrects the luminance values of the pixels. With this, the correction unit 116 corrects the image with the image quality degraded due to the unnecessary diffracted light. For example, the correction unit 116 corrects the luminance values of all of the pixels with the luminance values smaller than the first luminance value Imax and larger than the second luminance value Imin to the second luminance value Imin, such that the luminance is lower than luminance of the luminance values before the correction. Furthermore, the correction unit 116 obscures the boundary of the corrected image in the evaluation area and the image around the evaluation area. More specifically, the correction unit 116 performs processing such as averaging and Gaussian filtering, using the luminance values of the pixels around the boundary. This reduces the gap of luminance at the boundary of the evaluation area after correcting the image in the evaluation area.

On the other hand, when the second luminance value Imin is larger than the predetermined threshold (No in step S108), the correction unit 116 does not perform the correction in step S109. In such a case, there is a possibility that another object image overlaps with the object image corresponding to the saturated pixel group selected in step S103. Thus, the correction unit 116 does not correct the evaluation area. With this, the correction unit 116 can reduce the number of inadvertent correction on the object image. Furthermore, the correction unit 116 can reduce the processing load, since it is unnecessary to correct the evaluation area where the unnecessary diffracted light image is not detected due to high luminance in the background.

Note that, the predetermined threshold may be suitably set at a value determined according to an expected usage environment. For example, the predetermined threshold may be 128 which is half the 256 tones, or 85, which is one third of the 256 tones. In addition, the fixed value determined in advance may not be used as the predetermined threshold, and the predetermined threshold may be automatically determined according to the actual usage environment. For example, when the entire image is dark since the image was captured at night (a case where the distribution of the histogram is biased toward low luminance side, for example), there is a low possibility that the object image which shall not be deleted overlaps. Thus, it is preferable to set the predetermined threshold at a rather large value. On the other hand, when the entire image is bright, for example, (a case where the distribution of the histogram is biased toward high luminance, for example), there is a high possibility that the object image that shall not be deleted overlaps. Thus, it is preferable to set the predetermined threshold at a rather small value. In this case, the object image is bright to some degree. Thus, it is highly likely that the unnecessary diffracted light image does not stand out, even if the unnecessary diffracted light images overlap. Accordingly, no problem would arise even if the unnecessary diffracted light images are not removed. The predetermined threshold here may be determined according to a value calculated by integrating the sum of the luminance of all of the pixels on the image.

Next, the evaluation area setting unit 111 determines whether or not all of the saturated pixel groups set in step S102 are selected in step S103 (step S110). Here, when not all of the saturated pixel groups are selected (No in step S110), the evaluation area setting unit 111 selects the saturated pixel group that has not been selected yet (step S103). On the other hand, when all of the saturated pixel groups are selected (Yes in step S110), the process ends.

Figure 6:
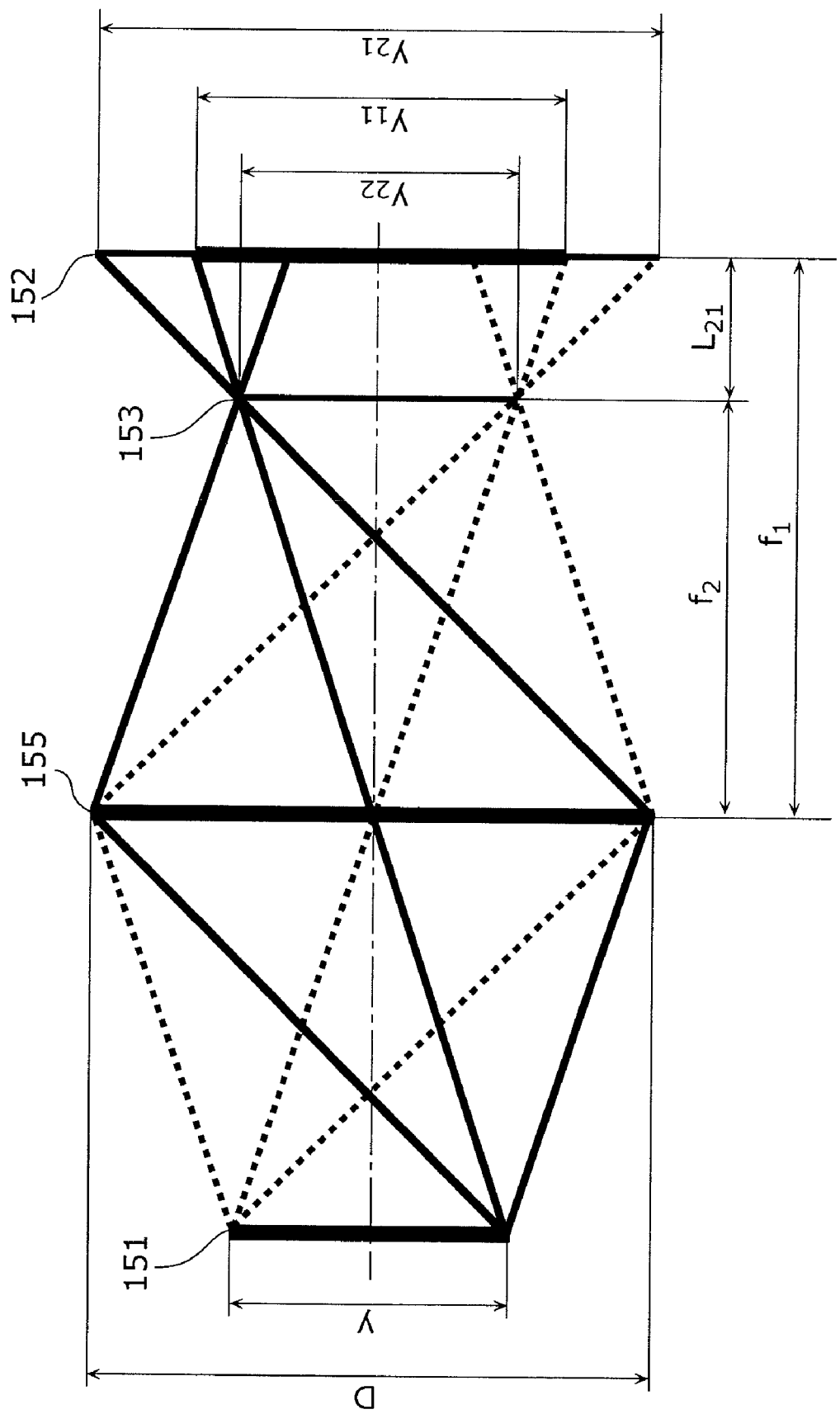
FIG. 6 schematically illustrates a position where an image of second order light forms on the first order light imaging plane and the second order light imaging plane.
Figure 7:
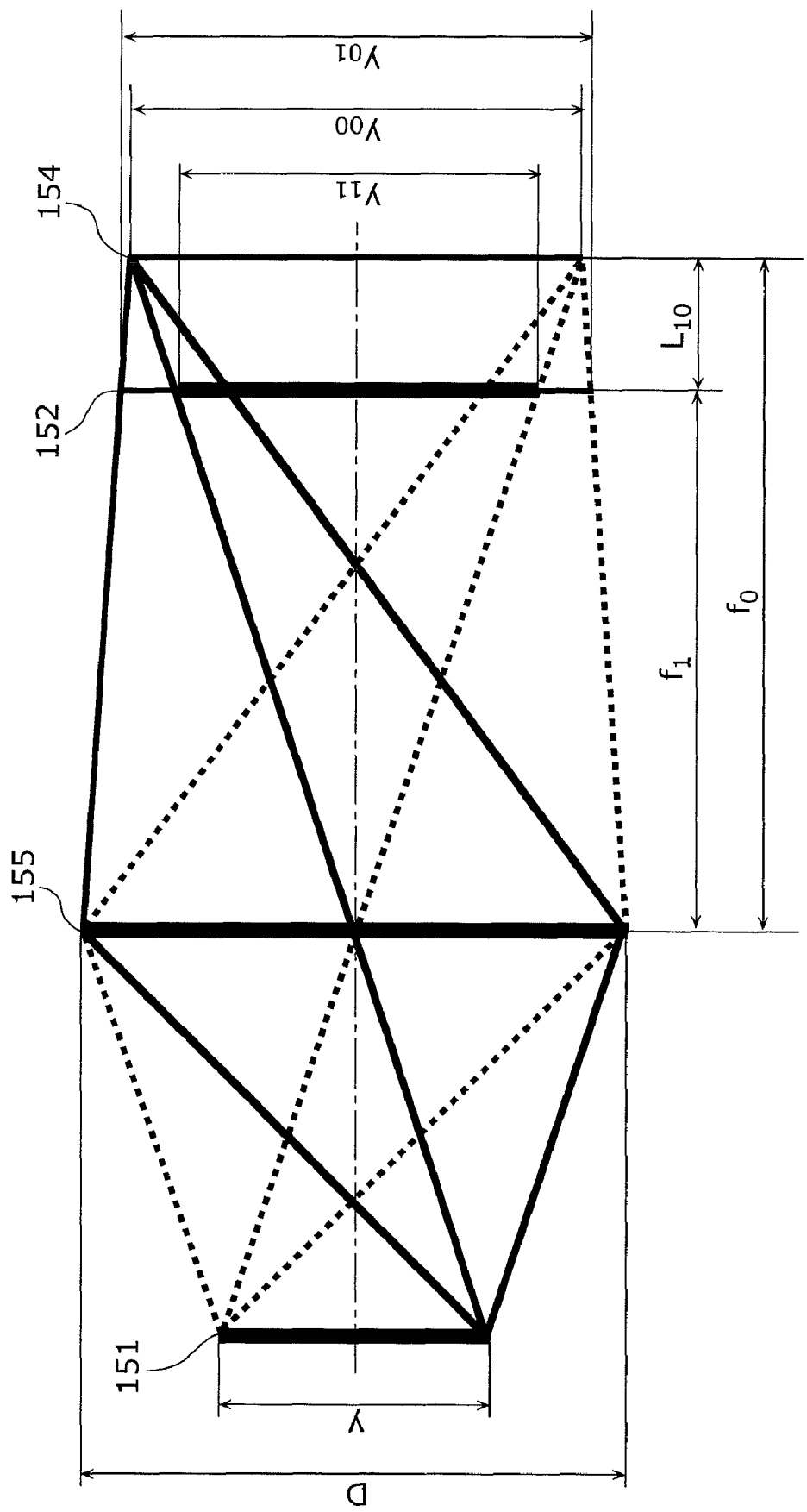
FIG. 7 is a diagram schematically illustrating a position where an image of zero order light forms an image on the first order light image imaging plane and on the zero order light imaging plane.

The following describes the imaging range of the light at a predetermined diffraction order included in the unnecessary diffracted light, which is set as an evaluation area by the evaluation area setting unit 111 as the evaluation area, with reference to FIGS. 6 and 7. Note that the following describes a case where the light of the designed diffraction order is first order light.

FIG. 6 schematically illustrates a position where an image formed by second order light forms on a first order light imaging plane 152 and on second order light imaging plane 153. The first order light and the second order light generated by the light from the object 151 with the size y transmitting an optical system 155 with the entrance pupil diameter D is formed on the first order light imaging plane 152 and the second order light imaging plane 153. Since the designed diffraction order is 1, the imaging element 105 is positioned such that the imaging plane corresponds to the first order imaging plane 152.

Here, the following equations are satisfied when the focal length of the first order light is f1, the focal length of the second order light is f2, the size of the second order light image on the second order light imaging plane 153 is y22, the size of the second order light image on the first order light imaging plane 152 is y21, the size of the first order light image on the first order light imaging plane 152 is y11, the distance between the first order light imaging plane 152 and the second order light imaging plane 153 is L21, and the entrance pupil diameter is D.

[Math. 2]

$$y_{22} = \frac{f_2}{f_1} y_{11} \quad (2)$$

$$\frac{D + y_{22}}{f_2} = \frac{y_{21} - y_{22}}{L_{21}} \quad (3)$$

$$L_{21} \cong f_1 - f_2 \quad (4)$$

Reorganizing the equations (2), (3), and (4) leads to the following equation (5).

[Math. 3]

$$y_{21} = y_{11} + \frac{f_1 - f_2}{f_2} D \quad (5)$$

The first order light focal length f1, the second order light focal length f2, and the entrance pupil diameter D are coefficients that can be obtained in advance. Thus, when the second order light is dominant unnecessary diffracted light, the evaluation area setting unit 111 sets a rectangle area having a side with the length of y21 as the evaluation area, assuming that the rectangle area is the imaging range of the second order light.

FIG. 7 schematically illustrates a position where the image formed by zero order light forms on the first order light imaging plane 152 and the zero order light imaging plane 154 Here, the following equation (6) is derived when the focal length of the first order light is f1, the focal length of the zero order light is f0, the size of the zero order light image on the zero order light imaging plane 154 is y00, the size of the zero order light image on the first order light imaging plane 152 is y01, the size of the first order light image on the first order light imaging plane 152 is y11, and the entrance pupil diameter is D.

[Math. 4]

$$y_{01} = y_{11} + \frac{f_0 - f_1}{f_0} D \quad (6)$$

Thus, when the zero order light is the dominant unnecessary diffracted light, the evaluation area setting unit 111 sets a rectangle area having a side with the length of y01 as the evaluation area, assuming that the rectangle area is the imaging range of the zero order light.

As such, the evaluation area setting unit 111 can set the evaluation area according to the size of the saturated pixel group and the characteristics of the optical system 101. Thus, the evaluation area setting unit 111 can set the evaluation area not to include the areas where the unnecessary diffracted light image does not exist but to include all of the areas where the unnecessary diffracted light image exist. As a result, the imaging device 100 can reduce the number of inadvertent correction on the object image that does not need correction. Furthermore, the imaging device 100 can reduce the process amount on the area where the unnecessary diffracted light image does not exist, and thereby reducing the processing load.

Note that, when the dominant diffraction order of the unnecessary diffracted light is unknown, the evaluation area setting unit 111 may calculate a size of the image on the first order light imaging plane 152 for each of the possible diffraction orders, and determines the size of the largest image among the calculated images as the size of the evaluation area.

In addition, evaluation area setting unit 111 does not necessarily have to match the size of the evaluation area and the size of the image obtained by the equation (5) or the equation (6) precisely. The evaluation area setting unit 111 may determine the size obtained by adding a predetermined constant to the size of the image obtained by the equation (5) or the equation (6) in order to lower the possibility that the unnecessary diffracted light image exists outside the evaluation area.

As described above, the imaging device 100 according to Embodiment 1 can remove the unnecessary diffracted light image from the image including the unnecessary diffracted light image.

Figure 8:
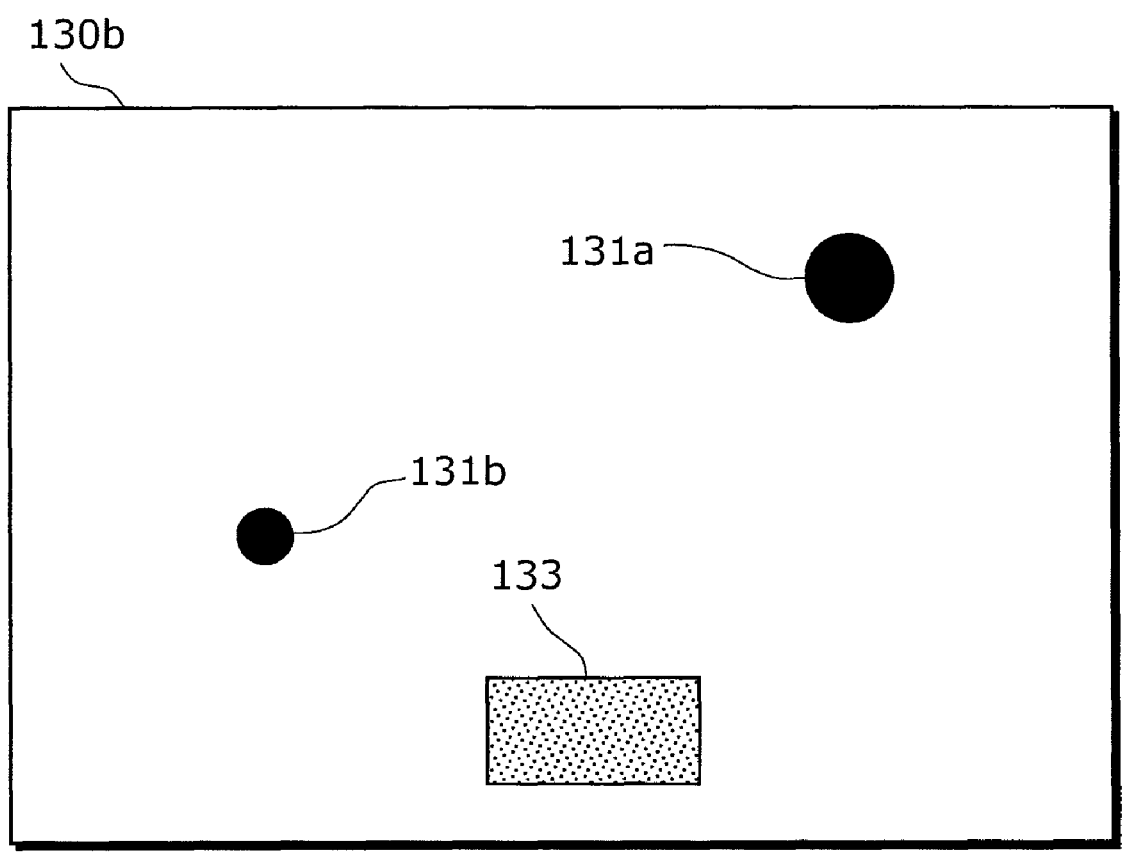
FIG. 8 illustrates an example of an image corrected by an imaging device according to Embodiment 1 of the present invention.

FIG. 8 illustrates an example of the image corrected by the imaging device 100. Note that the image 130b in FIG. 3 is illustrated to represent the maximum luminance in black and the minimum luminance in white. Furthermore, the image 130b is a corrected image of the image 130a illustrated in FIG. 3.

As shown in FIG. 8, the imaging device 100 according to Embodiment 1 can correct an area of image where the saturated pixels with high possibility that the unnecessary diffracted light image exist nearby. Thus, it is possible to reduce the number of inadvertent correction on the object image that does not need correction. More specifically, the imaging device 100 can remove the unnecessary diffracted light images 132a and 132b only, without removing the object image 133 with the luminance value close to the luminance value of the unnecessary diffracted light images 132a and 132b.

Furthermore, even when multiple objects are captured, the imaging device 100 can set the evaluation area for each of the saturated pixel group corresponding to the objects. Thus, it is possible to reduce the number of inadvertent correction on the object image that does not need correction. More specifically, the imaging device 100 can set the evaluation areas 134a and 134b for the object images 131a and 131b, respectively, reducing the possibility of removing the object image 133.

Furthermore, the imaging device 100 determines the luminance value of the pixel that needs correction, based on the transition of the pixel count for each luminance value in the evaluation area. Thus, it is possible to correct the image at high precision, regardless of the shape of the unnecessary diffracted light image. More specifically, the imaging device 100 can determine the first luminance value according to the characteristics of the luminance value distribution illustrated in FIG. 5. Furthermore, the imaging device 100 can determine the second luminance value using the luminance value of the pixels at the periphery of the evaluation area which are assumed to be least affected by the unnecessary diffracted light in the evaluation area. The imaging device 100 can thus determine the pixels which need correction using the first luminance value and the second luminance value determined as described above. This enables highly precise correction of the image regardless of the shape of the unnecessary diffracted light image.

Furthermore, the imaging device 100 can correct the image using only one image, and thus, it is possible to correct the image even when the object is with motion.

Figure 9A:
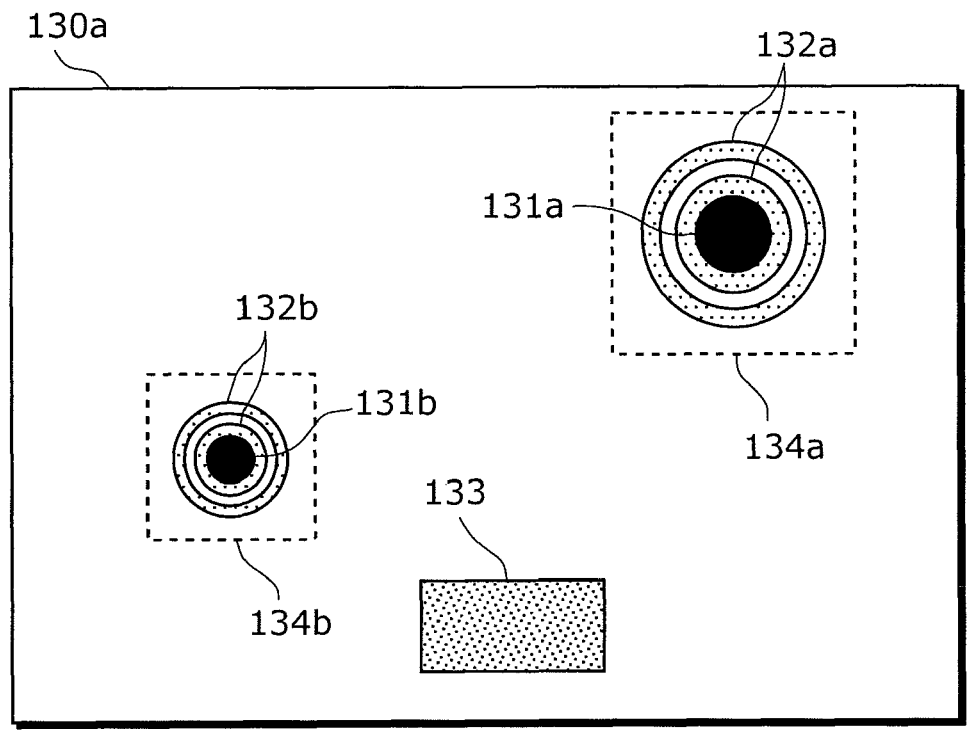
FIG. 9A illustrates an example of an unnecessary diffracted light image.
Figure 9B:
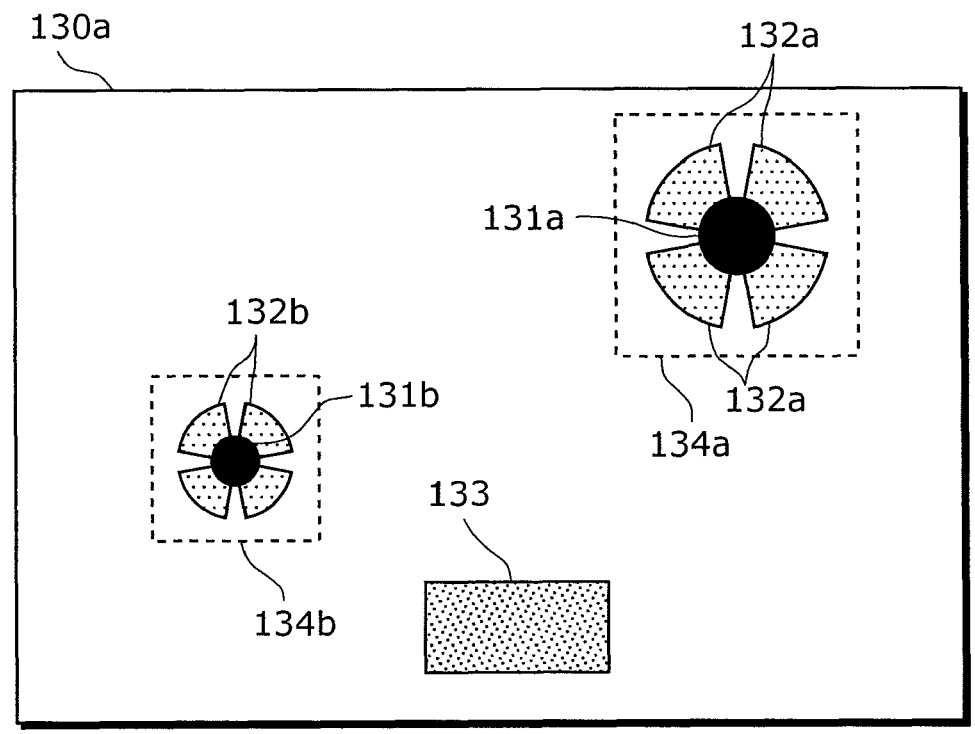
FIG. 9B illustrates an example of an unnecessary diffracted light image.

Furthermore, the imaging device 100 according to Embodiment 1 can perform a highly precise correction on the image not only when the unnecessary diffracted light images 132a and 132b are successive images, but also when the unnecessary diffracted light images 132a and 132b are groups of pixels that are intermittently formed around the saturated pixel group. More specifically, the imaging device 100 can perform a highly precise correction on images even when the unnecessary diffracted light images 132a and 132b are the multiple concentric rings as shown in FIG. 9A, for example. Furthermore, the imaging device 100 can perform a highly precise correction on images even when the unnecessary diffracted light images 132a and 132b have radially divided shapes as illustrated in FIG. 9B, for example. In addition, the imaging device 100 can perform a highly precise correction on images even when each of the unnecessary diffracted light images 132a and 132b has a radially-divided concentric circular shape; that is, the combination of the shapes in FIGS. 9A and 9B.

(Embodiment 2)

An evaluation device according to Embodiment 2 of the present invention shall be described hereafter with reference to the drawings. Note that the same reference numerals are attached to the components identical to those in the imaging device in Embodiment 1, and the description for those components are omitted.

Figure 10:
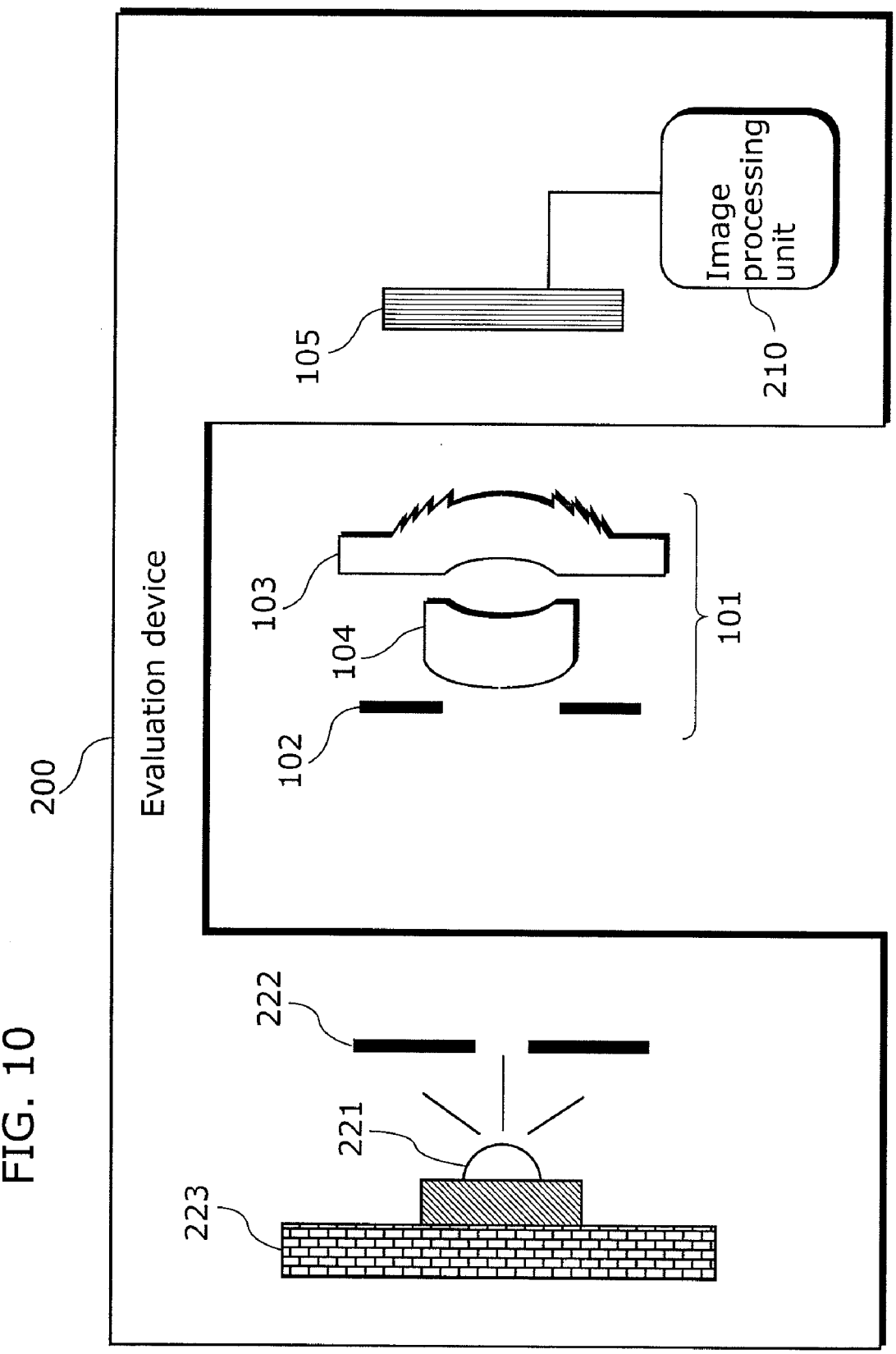
FIG. 10 illustrates a structure of an evaluation device according to Embodiment 2 of the present invention.

FIG. 10 illustrates the structure of the evaluation device 200 according to Embodiment 2. As illustrated in FIG. 10, the evaluation device 200 includes a light source 221, a shielding unit 222, a movable mechanism 223, an imaging element 105 and the image processing unit 210.

The light source 221 is attached to the movable mechanism 223. The light source 221 is placed in a dark room. Placing the light source 221 in the dark room as described above can eliminate the influence of the light from a source other than the light source 221. This allows the evaluation device 200 to precisely evaluate the capability of the optical system 101 regarding the unnecessary diffracted light.

The shielding unit 222 is provided between the light source 221 and the optical system 101, and has a circular aperture. Furthermore, the shielding unit 222 moves along with the light source 221 with the movement of the light source 221. As described above, providing the shielding unit 222 allows the object to be considered as a point source of light. Since the object is the point source of light, the overlapped section of the object image and the unnecessary diffracted light image is reduced. Thus, the evaluation device 200 can highly precisely evaluate the capability of the optical system 101 regarding the unnecessary diffracted light.

The movable mechanism 223 includes a XYZ stage and a micrometer, and can determine the positions of the light source 221 and the shielding unit 222 at any position. In other words, the evaluation device 200 can capture the light from the light source 221 that passed through the aperture of the shielding unit 222 at any angle of view.

Figure 11:
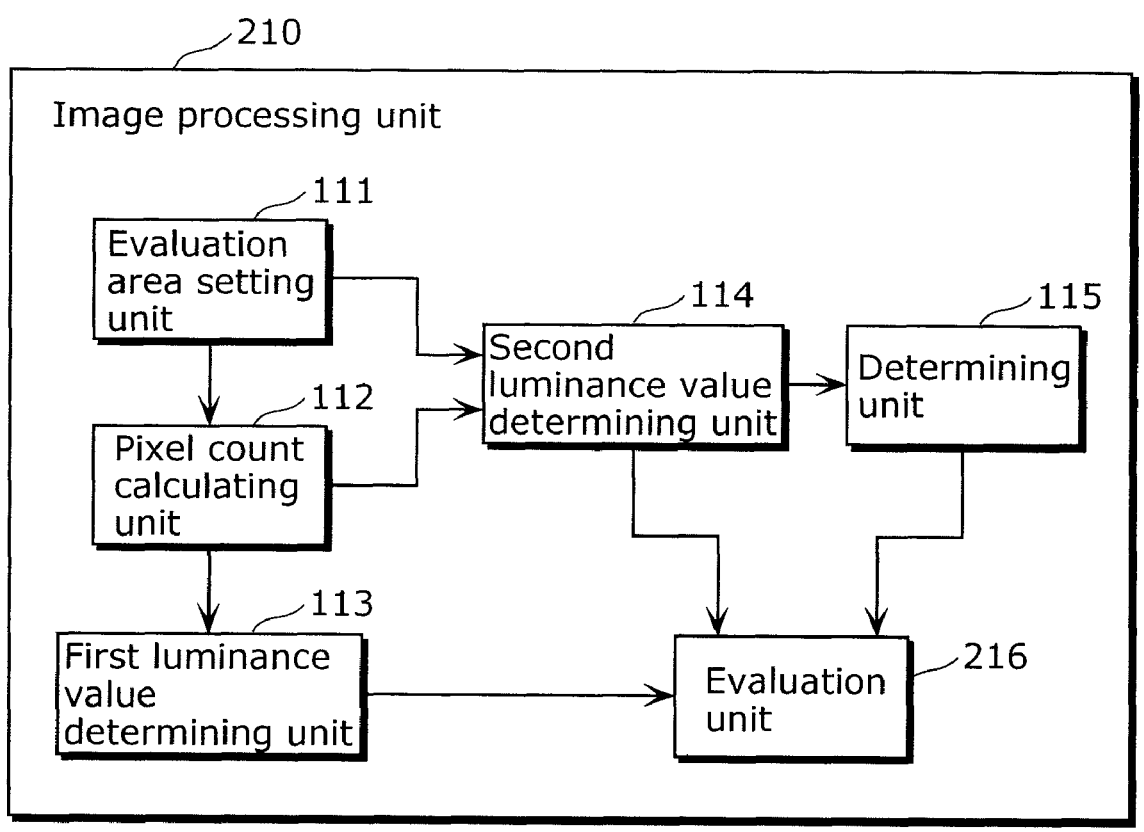
FIG. 11 is a block diagram illustrating a characteristic functional structure of an image processing unit which evaluates capability regarding the unnecessary diffracted light.

FIG. 11 is a block diagram illustrating a characteristic functional structure of an image processing unit 210 which evaluates capability regarding the unnecessary diffracted light. As shown in FIG. 11, the image processing unit 210 according to Embodiment 2 differs from the image processing unit 110 according to Embodiment 1 in including an evaluation unit 216 instead of the correction unit 116 and that the process by the second luminance value determining unit 144 is partially different. However, the rest of the components are identical.

The second luminance value determining unit 114 determines the average value of the luminance values of the image captured without lighting up the light source 221 as the second luminance value.

The evaluation unit 216 evaluates the capability of the optical system 101 regarding the unnecessary diffracted light, using the luminance value of the pixels of luminance lower than the luminance of the first luminance value and higher than the luminance of the second luminance value, from among the pixels included in the evaluation area. More specifically, the evaluation unit 216 evaluates the capability of the optical system 101 regarding the unnecessary diffracted light, using the integrated value of the luminance values of the pixels. The evaluation unit 216 may further evaluate the capability of the optical system 101 regarding the unnecessary diffracted light, using the integrated value of the difference between the luminance values of the pixels and the second luminance value.

Furthermore, the evaluation unit 216 evaluates the capability of the optical system 101 regarding the unnecessary diffracted light for each of the images captured corresponding to multiple views of angles.

The technique described above enables the evaluation device 200 to evaluate the area including the highly saturated pixels regarding the unnecessary diffracted light. The existence of the saturated pixels indicates a high possibility of the unnecessary diffracted light image on the periphery. Therefore, the evaluation device 200 can reduce the number of cases where the object image that is not to be evaluated is inadvertently determined as the object to be evaluated.

Furthermore, the luminance values of the pixels that need to be evaluated are determined based on the transition of the pixel count for each luminance value in the evaluation area. This enables a highly precise evaluation of the unnecessary diffracted light, regardless of the shape of the unnecessary diffracted light.

Furthermore, the evaluation can be performed using only one image. Thus, it is possible to perform the evaluation regarding the unnecessary diffracted light even when the object is with motion.

Note that the evaluation device 200 may include an object lens arranged between the optical system 101 and the imaging element 105. This allows magnifying the image corresponding to the unnecessary diffracted light. Thus, it is possible to evaluate the capability of the optical system 101 regarding the unnecessary diffracted light at higher precision.

Furthermore, in the optical system 101 including the diffractive optical element 103, the distribution and the amount of the unnecessary diffracted light differ depending on the wavelength. Thus, the evaluation device 200 may include a wavelength band pass filter. This enables the evaluation device 200 to evaluate the images obtained for each wavelength, allowing the evaluation of the capability of the optical system 101 regarding the unnecessary diffracted light at higher precision. Note that the wavelength band pass filter may be arranged between the optical system 101 and the light source 221, or between the optical system 101 and the imaging element 105.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, the present invention may be implemented as an image processing device including the image processing unit 110 included in the imaging device 100 according to Embodiment 1, or the image processing unit 210 included in the evaluation device 200 according to Embodiment 2.

Furthermore, the image processing unit 110 included in the imaging device according to Embodiment 1 or the image processing unit 210 included in the evaluation device 200 according to Embodiment 2 may process the images each of which corresponds to a corresponding one of the wavelength bands, for each wavelength band. In this case, the evaluation area setting unit 111 may change the size of the evaluation area for each wavelength band. For example, when the diffraction efficiency of the G-wavelength band is higher than the diffraction efficiencies of the R-wavelength band and the B-wavelength band, the evaluation area setting unit 111 may set the evaluation area of the G-wavelength band to be smaller than the evaluation areas of the R-wavelength band and the B-wavelength band.

As described above, the imaging device can correct the degraded image quality due to the unnecessary diffracted light at high precision even if the image was captured by the optical system including a diffractive optical element with different characteristics of unnecessary diffracted light depending on wavelengths, through processing by the image processing unit 110 for each wavelength band. The evaluation device can further evaluate, for each wavelength band, the capability of the optical system including the diffractive optical element with different characteristics of unnecessary diffracted light depending on wavelength.

Furthermore, the evaluation area setting unit 111 according to Embodiments 1 and 2 sets the evaluation area 134a such that the center of the evaluation area corresponds to the center of the object image 131a. However, the imaging device and the evaluation device according to the present invention are not limited to such an imaging device or an evaluation device. For example, the evaluation area setting unit 111 may change the center of the evaluation area depending on the angle of view of the object. Furthermore, the evaluation area setting unit 111 may change the center of the evaluation area depending on the wavelength band of the image. This allows further improvements on the correction and evaluation.

Furthermore, the evaluation area setting unit 111 in Embodiments 1 and 2 sets a rectangle evaluation area 134a in order to facilitate calculations in image processing. However, the imaging device and the evaluation device according to the present invention are not limited to such an imaging device or an evaluation device. For example, the evaluation area setting unit 111 may set an evaluation area substantially similar to the shape of the saturated pixels. In this case, the second luminance value determining unit 114 may determine the average value of the luminance values of the pixels located at the periphery of the evaluation area as the second luminance value.

As described above, the evaluation area setting unit 111 can set the evaluation area with a shape similar to the shape of the unnecessary diffracted light image by setting an evaluation area with the shape substantially similar to the shape of the saturated pixels image group. As a result, the imaging device can reduce the number of inadvertent correction on the object image that does not need correction. In addition, the evaluation device can reduce the cases where the optical system is evaluated using the object image mistaken as the unnecessary diffracted light image.

Furthermore, the first luminance value determining unit 113 in Embodiments 1 and 2 determine the luminance value when the pixel count exceeds the predetermined pixel count for the first time while tracing the transition of the pixel count from larger luminance values to smaller luminance values. However, the imaging device and the evaluation device according to the present invention are not limited to such an imaging device or an evaluation device.

For example, the first luminance value determining unit may calculate the luminance value of the highest luminance among luminance values each of which is in a highest point of an upper convex formed by a transition of the pixel counts except a luminance value of the saturated pixel, in a case where a horizontal axis represents the luminance values and a vertical axis represents the pixel counts, and may determine, as the first luminance value, a luminance value of luminance higher than the calculated luminance value and lower than luminance value of the saturated pixel. More specifically, the first luminance value determining unit 113 calculates, among the peaks 141, 142, and 143 of the histogram illustrated in FIG. 5, the luminance value of the peak 143 indicating the highest luminance except the peak 142 which corresponds to the luminance value of the saturated pixel. Subsequently, the first luminance value determining unit 113 determines the intermediate value of the luminance value of the peak 143 and the luminance value of the saturated pixel as the first luminance value. Note that the intermediate value is an example. The first luminance value determining unit 113 may determine the average value of the luminance value of the peak 143 and the luminance value of the saturated pixel as the first luminance value. More specifically, the first luminance value determining unit 113 determines the luminance value larger than the luminance value of the peak 143 and smaller than the luminance value of the saturated pixel as the first luminance value.

With this, the imaging device or the evaluation device can determine the first luminance value indicating the maximum luminance of the unnecessary diffracted light according to the characteristics of the luminance value distribution of the pixels in the evaluation area. Thus, the imaging device can correct the image and the evaluation device can evaluate the optical system at high prevision, regardless of the shape of the unnecessary diffracted light.

Furthermore, the second luminance value determining unit 114 according to Embodiments 1 and 2 determines the second luminance value based on the luminance value of the pixel at the edge of the evaluation area. However, the second luminance value may be determined using the transition of the luminance values. In other words, the second luminance value determining unit 114 determines the luminance value of the lowest luminance among luminance values each of which is in a highest point of an upper convex formed by a transition of the pixel counts, in a case where the horizontal axis represents the luminance value and the vertical axis represents the pixel count. More specifically, the second luminance value determining unit 114 determines the luminance value of the peak 141 in the histogram illustrated in FIG. 5 as the second luminance value, for example.

With this, the second luminance value determining unit 114 can determine the second luminance value depending on the characteristics of the luminance value distribution of the pixel in the evaluation area. Thus, the luminance value corresponding to the background can be determined at high precision, without being affected by the shape of the unnecessary diffracted light image.

Furthermore, the imaging device 100 according to Embodiment 1 and the evaluation device 200 according to Embodiment 2 include the determining unit. However, the imaging device or the evaluation device according to the present invention does not necessarily include the determining unit. Even if the determining unit is not included, the imaging device or the evaluation device can determine the luminance value of the pixel which needs correction based on the transition of the pixel count for each luminance value in the evaluation area. Thus, it is possible to correct the image at high precision, regardless of the shape of the unnecessary diffracted light image. Note that, when the determining unit is not included, the correction unit may correct the luminance value of the pixel including the luminance value from the first luminance value to the second luminance value, regardless of the value of the second luminance value.

In addition, the present invention may be implemented not only as the imaging device or the evaluation device, but also as an image processing method or the optical system evaluation method including the characteristic processing unit included in the imaging device or the evaluation device as steps, or a program causing a computer to execute these steps. Needless to say, such a program may be distributed via a recoding media such as CD-ROM and transmission media such as the Internet.

EXAMPLES

The following describes the present invention more specifically with reference to Examples. Note that the present invention is not limited to the following examples.

Example 1

The following describes the imaging device according to Embodiment 1 of the present invention.

The imaging device 100 according to Example 1 generates a color image that has 640 by 480 pixels and 256 luminance tones. Subsequently, the imaging device 100 obtains the image in B-wavelength band by extracting the B-wavelength component from the generated color image.

The diffractive optical element L03 included in the optical system 101 of the imaging device 100 according to Example 1 includes a diffraction grating designed to have a diffraction efficiency of 100% in the G-wavelength band. Therefore, the optical system 101 in Example 1 does not have the diffraction efficiency of 100% with respect to the light in B-wavelength band. To put it differently, the optical system 101 generates unnecessary diffracted light with respect to the light in B-wavelength band.

Figure 12:
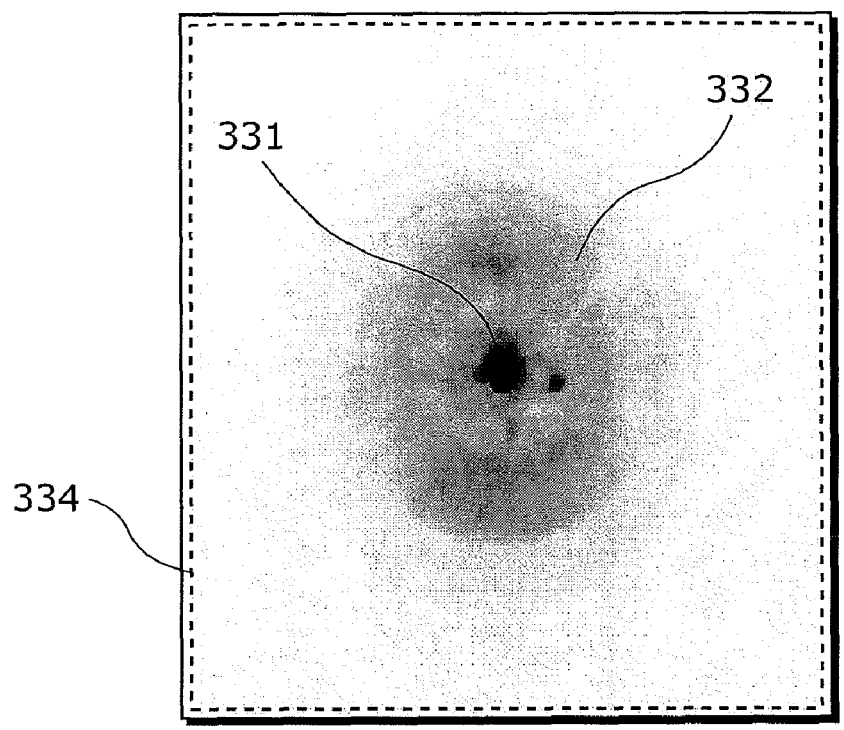
FIG. 12 illustrates an image which is obtained by cutting only an evaluation area out of an image in B-wavelength band captured by an imaging device according to Example 1 of the present invention.

FIG. 12 illustrates an image which is obtained by cutting an image in B-wavelength band captured by an imaging device according to Example 1 of the present invention. Note that, the image illustrated in FIG. 12 illustrates such that the higher the luminance (the larger the luminance value), the darker the representation color becomes. In addition, a gamma correction is performed on the image displayed in FIG. 12 so as to clearly show the degradation in image quality due to the unnecessary diffracted light.

As shown in FIG. 12, the image in the B-wavelength captured by the imaging device 100 according to Example 1 detected the low luminance unnecessary diffracted light image 332 around the high luminance object image 331.

Thus, the evaluation area setting unit 111 set a rectangle area with the size that the unnecessary diffracted light image 332 sufficiently fits as the evaluation area 334. More specifically, the size of the evaluation area 334 was 300 by 300 pixels. Since the object positioned near the optical axis was captured, the evaluation area setting unit 111 set the evaluation area 334 such that the center of the object image 331 with saturated luminance value corresponds to the center of the evaluation area 334.

Figure 13:
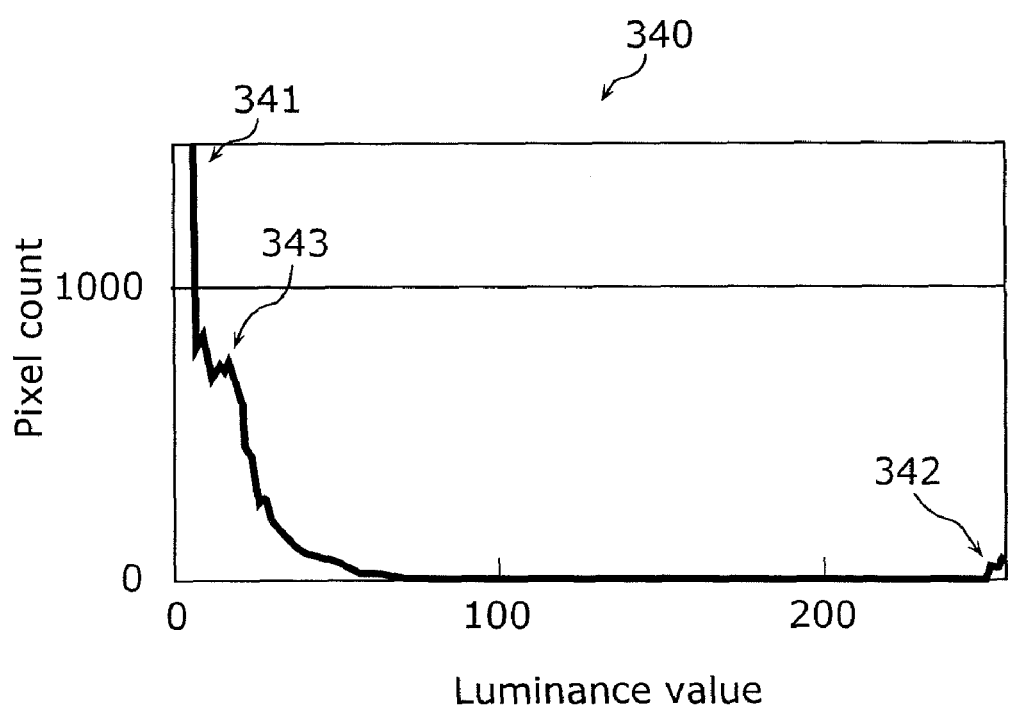
FIG. 13 is a histogram showing luminance value in the evaluation area illustrated in FIG. 12.

FIG. 13 is a histogram 340 of luminance values in the evaluation area 334 illustrated in FIG. 12. In Example 1, the pixel count calculating unit 112 calculated moving average of the calculated pixel count using the adjacent 5 pixels in order to remove the noise. As illustrated in FIG. 13, the histogram 340 shows three separate peaks; namely, the peak 341 corresponding to the background, the peak 343 corresponding to the unnecessary diffracted light image 332, and the peak 342 corresponding to the object image 331 with the saturated luminance value.

The first luminance value determining unit 113 determined the intermediate value "120" between the luminance value of the peak 342 corresponding to the object image 331 with saturated luminance value and the luminance value of the peak 343 corresponding to the unnecessary diffracted light image 332 as the first luminance value Imax which is the maximum luminance value of the unnecessary diffracted light image 332.

Furthermore, the second luminance value determining unit 114 determined the average value "0.72" of the luminance values of the pixels included in an area of 10 by 10 pixels, each of vertices corresponding to four vertices of the evaluation area 334, as the second luminance value Imin which is the minimum luminance value of the unnecessary diffracted light image 332.

Subsequently, the correction unit 116 corrected, to the second luminance value Imin, the luminance value of the pixels with the luminance values ranging from the second luminance value Imin to the first luminance value Imax.

Figure 14:
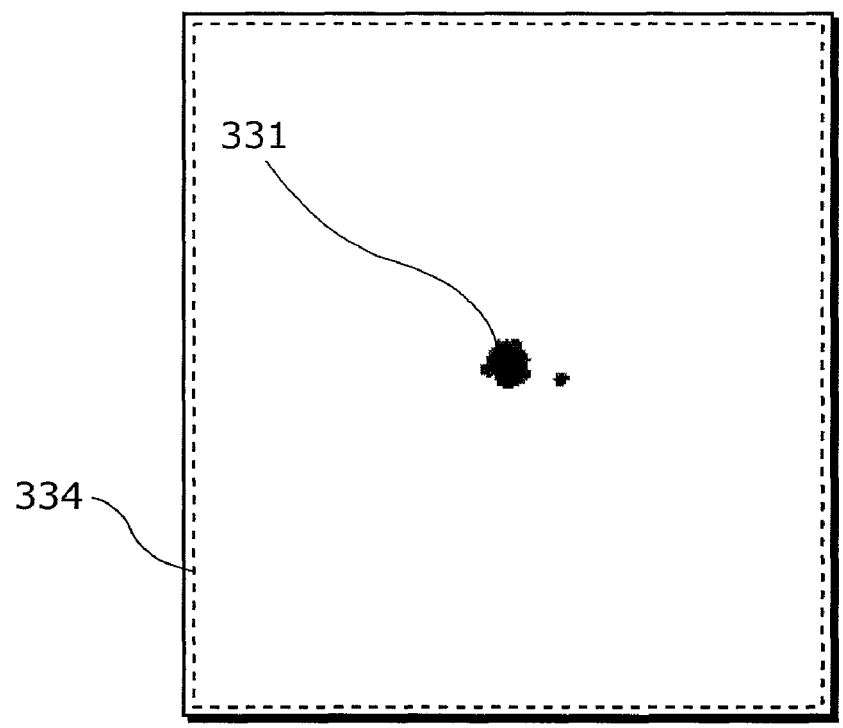
FIG. 14 illustrates an image corrected by the imaging device according Embodiment 1 of the present invention.

FIG. 14 illustrates an image on which a correction by the imaging device according to Example 1 is performed. As illustrated in FIG. 14, the unnecessary diffracted light image 332 with uneven distribution that was present in the image within the evaluation area 334 illustrated in FIG. 12 was completely removed.

Example 2

The following describes the imaging device according to Embodiment 2 of the present invention.

The evaluation device 200 evaluated, with regard to the unnecessary diffracted light, the optical system 101 which includes a diffractive optical element with optical material with the reflectivity and refractive index dispersion different from the base material is painted as a protective film on a plane where the diffraction grating is formed. The diffractive optical element is an optical element created for reducing the occurrence of the unnecessary diffracted light. Therefore, it is necessary to evaluate, at high precision, whether or not the occurrence of the unnecessary diffracted light is reduced as designed.

The evaluation device 200 in Example 2 includes a shielding unit 222 with a circular aperture, placed between the light source 221 and the optical system 101, as illustrated in FIG. 10, since the object is a point source of light. Therefore, the optical system 101 forms the light emitted from the aperture of the shielding unit 222 on the imaging plane of the imaging element 105.

Furthermore, the evaluation device 200 includes an object lens placed between the optical system 101 and the imaging element 105.

The evaluation device 200 received a magnified image of the object. The evaluation area setting unit 111 then set the evaluation area from the obtained image. The evaluation area was of 300 by 300 pixels. In addition, the evaluation area setting unit 111 set the evaluation area such that the center of the evaluation area corresponds to the center of the object image with saturated luminance value.

Next, the pixel count calculating unit 112 created the histogram by calculating the pixel count for each luminance value within the evaluation area, in the same manner as Example 1.

Subsequently, the first luminance value determining unit 113 determined the intermediate value of the peak luminance value corresponding to the object image and the peak luminance value corresponding to the unnecessary diffracted light image in the histogram as the first luminance value Imax, as in Example 1. Here, the determined first luminance value Imax was "118".

In addition, the second luminance value determining unit 114 determined the average luminance value of the image captured with the light source 221 turned off as the second luminance value. Here, the determined second luminance value Imin was "0.60".

Thus, the evaluation unit 216 integrated the luminance values of the pixels with the luminance values ranging from the second luminance value Imin to the first luminance value Imax.

The evaluation device 200 in Example 2 performed the above process on the images with the angles of view 0 degree, 10 degrees, and 30 degrees that are obtained by moving the light source 221.

Figure 15:
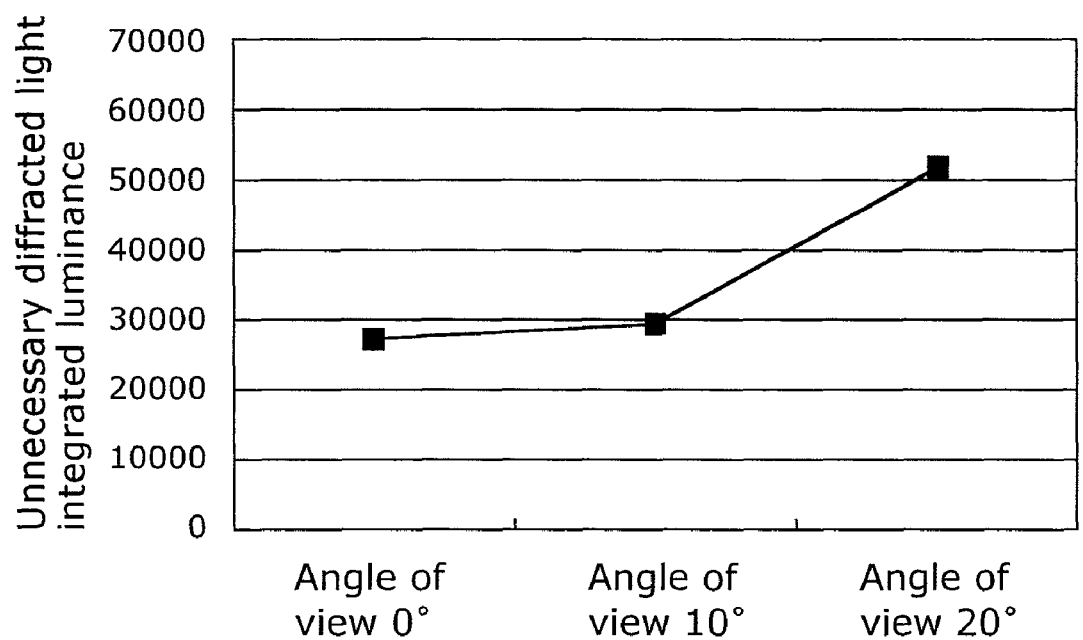
FIG. 15 is a chart illustrating a relationship between integrated value of the luminance values of the unnecessary diffracted light image obtained by the evaluation device according to Embodiment 2 of the present invention and angles of view.

FIG. 15 is a chart illustrating the relationship of the integrated value of the luminance values of the unnecessary diffracted light image obtained by the evaluation device 200 in Example 2 and the angles of view. As illustrated in FIG. 15, in the optical system 101 in Example 2 shows that more unnecessary diffracted light was observed as the angles of image increase. Thus, it is possible to improve the design of the diffractive optical element, based on the calculated integrated value, for example. Furthermore, it becomes possible to test the manufactured diffractive optical element, by determining whether or not the calculated integrated value is equal to or less than the predetermined threshold.

[Industrial Applicability]

The image processing device and others according to the present invention can be used as an image processing device and an imaging device that can correct the image with degraded image quality due to the unnecessary diffracted light generated in the optical system including a diffractive optical element at high precision, and are applicable to digital cameras, digital video cameras, and mobile phones, for example. Furthermore, the evaluation device and others according to the present invention can be used as an evaluation device and others that can quantitatively evaluate the capability of the optical system including the diffractive optical element with respect to the unnecessary diffracted light, as a testing apparatus included in an optical production line, for example.

[Reference Signs List]
100 Imaging device
101, 155 Optical system
102 Stop
103 Diffractive optical element
104 Refractive optical element
105 Imaging element
110, 210 Image processing unit
111 Evaluation area setting unit
112 Pixel count calculating unit
113 First luminance value determining unit
114 Second luminance value determining unit
115 Determining unit
116 Correction unit
120, 151 Object
121a, 121b, 221 Light source
123 Object
130a, 130b Image
131a, 131b, 133, 331 Object image
132a, 132b, 332 Unnecessary diffracted light image
134a, 134b, 334 Evaluation area
140, 340 Histogram
141, 142, 143, 341, 342, 343 Peak
152 First order light imaging plane
153 Second order light imaging plane
154 Zero order light imaging plane
200 Evaluation device
216 Evaluation unit
222 Shielding unit
223 Movable mechanism

The invention claimed is:

1. An image processing device which corrects an image with a degraded image quality due to unnecessary diffracted light generated in an optical system including a diffractive optical element, said image processing device comprising:
an evaluation area setting unit configured to detect a saturated pixel having a saturated luminance value, from among pixels included in the image and to set an area in the image including the detected saturated pixel as an evaluation area;
a pixel count calculating unit configured to calculate a pixel count for each of luminance values of pixels included in the set evaluation area;
a first luminance value determining unit configured to determine a first luminance value indicating a maximum luminance of an image of the unnecessary diffracted light, based on a transition of calculated pixel counts arranged in order of luminance value;
a second luminance value determining unit configured to determine a second luminance value which is a luminance value corresponding to a background of the image; and
a correction unit configured to correct a luminance value of a pixel of luminance lower than luminance of the first luminance value and higher than luminance of the second luminance value from among the pixels included in the evaluation area so as to lower the luminance of the pixel.

2. The image processing device according to claim 1, wherein, when the image includes a plurality of saturated pixels having the saturated pixel, said evaluation area setting unit is configured to set a saturated pixel group by grouping neighboring saturated pixels and to set the evaluation area for the set saturated pixel group.

3. The image processing device according to claim 2, wherein said evaluation area setting unit is configured to set the evaluation area that becomes larger as the saturated pixel group becomes larger.

4. The image processing device according to claim 3, wherein said evaluation area setting unit is configured to set an imaging range of diffracted light of a predetermined diffraction order as the evaluation area, the diffracted light corresponding to the saturated pixel group and being included in the unnecessary diffracted light.

5. The image processing device according to claim 1, wherein said first luminance value determining unit is configured to determine, as the first luminance value, a luminance value exceeding a predetermined pixel count for the first time while tracing a transition of the pixel counts from high luminance to low luminance.

6. The image processing device according to claim 1, wherein said first luminance value determining unit is configured to calculate a luminance value of highest luminance among luminance values each of which is in a highest point of an upper convex formed by a transition of the pixel counts except a luminance value of the saturated pixel, in a case where a horizontal axis represents the luminance values and a vertical axis represents the pixel counts, and to determine, as the first luminance value, a luminance value of luminance higher than the calculated luminance value and lower than luminance value of the saturated pixel.

7. The image processing device according to claim 1, wherein said second luminance value determining unit is configured to determine the second luminance value based on a luminance value of a pixel at an edge of the evaluation area.

8. The image processing device according to claim 1, wherein said second luminance value determining unit is configured to determine, as the second luminance value, a luminance value of lowest luminance among luminance values each of which is in a highest point of an upper convex formed by a transition of the pixel counts, in a case where a horizontal axis represents the luminance values and a vertical axis represents the pixel counts.

9. The image processing device according to claim 1, wherein each of the pixels included in the image has luminance values each of which corresponds to a corresponding one of wavelength bands,
said evaluation area setting unit is configured to set the evaluation area for each of the wavelength bands,
said pixel count calculating unit is configured to calculate the pixel count for each of the wavelength bands,
said first luminance value determining unit is configured to determine the first luminance value for each of the wavelength bands,
said second luminance value determining unit is configured to determine the second luminance value for each of the wavelength bands, and
said correction unit is configured to correct the luminance value for each of the wavelength bands.

10. The image processing device according to claim 1, wherein the luminance value corresponds to a specific wavelength band only.

11. The image processing device according to claim 1, wherein an image of the unnecessary diffracted light is composed of groups of pixels.

12. The image processing device according to claim 1, further comprising
a determining unit configured to determine whether or not the second luminance value is smaller than a predetermined threshold,
wherein said correction unit is configured to correct the luminance value only when said determining unit determines that the second luminance value is smaller than the predetermined threshold.

13. An image processing method for correcting an image with a degraded image quality due to unnecessary diffracted light generated in an optical system including a diffractive optical element, said image processing method comprising:
detecting a saturated pixel having a saturated luminance value, from among pixels included in the image and setting an area in the image including the detected saturated pixel as an evaluation area;
calculating a pixel count for each of luminance values of pixels included in the set evaluation area;
determining a first luminance value indicating a maximum luminance of an image of the unnecessary diffracted light, based on a transition of calculated pixel counts arranged in order of luminance value;
determining a second luminance value which is a luminance value corresponding to a background of the image; and
correcting a luminance value of a pixel of luminance lower than luminance of the first luminance value and higher than luminance of the second luminance value from among the pixels included in the evaluation area so as to lower the luminance of the pixel.

14. A non-transitory computer readable medium containing a program for correcting an image with a degraded image quality due to unnecessary diffracted light generated in an optical system including a diffractive optical element, said program causing the computer to execute:
detecting a saturated pixel having a saturated luminance value, from among pixels included in the image and setting an area in the image including the detected saturated pixel as an evaluation area;
calculating a pixel count for each of luminance values of pixels included in the set evaluation area;
determining a first luminance value indicating a maximum luminance of an image of the unnecessary diffracted light, based on a transition of calculated pixel counts arranged in order of luminance value;
determining a second luminance value which is a luminance value corresponding to a background of the image; and
correcting a luminance value of a pixel of luminance lower than luminance of the first luminance value and higher than luminance of the second luminance value from among the pixels included in the evaluation area so as to lower the luminance of the pixel.

15. An imaging device which corrects an image with a degraded image quality due to unnecessary diffracted light, said imaging device comprising:
an optical system including a diffractive optical element;
an imaging system which captures light that is transmitted said optical system; and
the image processing device according to claim 1.

16. An evaluation apparatus which evaluates capability, regarding unnecessary diffracted light, of an optical system including a diffractive optical element, said evaluation apparatus comprising:
a light source arranged at a predetermined distance from the optical system;
an imaging system which captures light which is from said light source and is transmitted said optical system;
an evaluation area determining unit configured to detect a saturated pixel having a saturated luminance value, from among pixels included in the image and to set an area in the image including the detected saturated pixel as an evaluation area;
a pixel count calculating unit configured to calculate a pixel count for each of luminance values of pixels included in the set evaluation area;
a first luminance value determining unit configured to determine a first luminance value indicating a maximum luminance of an image of the unnecessary diffracted light, based on a transition of calculated pixel counts arranged in order of luminance value;
a second luminance value determining unit configured to determine a second luminance value which is a luminance value corresponding to a background of the image; and
an evaluation unit configured to evaluate the capability of the optical system regarding the unnecessary diffracted light, using a luminance value of a pixel of luminance lower than luminance of the first luminance value and higher than luminance of the second luminance value from among the pixels included in the evaluation area.

17. The evaluation apparatus according to claim 16, wherein said light source is point source of light.

18. The evaluation apparatus according to claim 16, further comprising
an object lens which is arranged between the optical system and said imaging system and magnifies an image formed by the optical system.

19. An evaluation method for an evaluation apparatus which evaluates capability, regarding unnecessary diffracted light, of an optical system including a diffractive optical element,
wherein the evaluation apparatus includes:
a light source arranged at a predetermined distance from the optical system; and
an imaging system which captures light which is from said light source and is transmitted said optical system, and
said evaluation method comprising:
detecting a saturated pixel having a saturated luminance value, from among pixels included in the image and setting an area in the image including the detected saturated pixel as an evaluation area;
calculating a pixel count for each of luminance values of pixels included in the set evaluation area;
determining a first luminance value indicating a maximum luminance of an image of the unnecessary diffracted light, based on a transition of calculated pixel counts arranged in order of luminance value;
determining a second luminance value which is a luminance value corresponding to a background of the image; and
evaluating the capability of the optical system regarding the unnecessary diffracted light, using a luminance value of a pixel of luminance lower than luminance of the first luminance value and higher than luminance of the second luminance value from among the pixels included in the evaluation area.

20. A non-transitory computer readable medium containing a program for an evaluation apparatus which evaluates capability, regarding unnecessary diffracted light, of an optical system including a diffractive optical element,
wherein the evaluation apparatus includes:
a light source arranged at a predetermined distance from the optical system; and
an imaging system which captures light which is from said light source and is transmitted said optical system, and
said program causing the computer to execute:
detecting a saturated pixel having a saturated luminance value, from among pixels included in the image and setting an area in the image including the detected saturated pixel as an evaluation area;
calculating a pixel count for each of luminance values of pixels included in the set evaluation area;
determining a first luminance value indicating a maximum luminance of an image of the unnecessary diffracted light, based on a transition of calculated pixel counts arranged in order of luminance value;
determining a second luminance value which is a luminance value corresponding to a background of the image; and
evaluating the capability of the optical system regarding the unnecessary diffracted light, using a luminance value of a pixel of luminance lower than luminance of the first luminance value and higher than luminance of the second luminance value from among the pixels included in the evaluation area.

* * * * *